United States Patent
John Wilson et al.

(10) Patent No.: US 11,412,464 B2
(45) Date of Patent: Aug. 9, 2022

(54) TECHNIQUES FOR CONCURRENT UPLINK TRANSMISSIONS TO MULTIPLE TRANSMISSION RECEPTION POINTS

(71) Applicant: QUALCOMM Incorporated, San Diego, CA (US)

(72) Inventors: Makesh Pravin John Wilson, San Diego, CA (US); Tao Luo, San Diego, CA (US); Mostafa Khoshnevisan, San Diego, CA (US); Jing Sun, San Diego, CA (US); Arumugam Chendamarai Kannan, San Diego, CA (US); Xiaoxia Zhang, San Diego, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 16/720,276

(22) Filed: Dec. 19, 2019

(65) Prior Publication Data

US 2020/0205092 A1 Jun. 25, 2020

Related U.S. Application Data

(60) Provisional application No. 62/784,034, filed on Dec. 21, 2018.

(51) Int. Cl.
*H04W 52/40* (2009.01)
*H04L 5/00* (2006.01)
*H04W 52/28* (2009.01)

(52) U.S. Cl.
CPC ........... *H04W 52/40* (2013.01); *H04L 5/0032* (2013.01); *H04L 5/0044* (2013.01); *H04W 52/281* (2013.01)

(58) Field of Classification Search
None
See application file for complete search history.

(56) References Cited

U.S. PATENT DOCUMENTS

| | | | |
|---|---|---|---|
| 8,818,441 B2 * | 8/2014 | Haim | H04W 52/30 370/318 |
| 2011/0081936 A1 * | 4/2011 | Haim | H04W 52/06 455/522 |

(Continued)

FOREIGN PATENT DOCUMENTS

| | | |
|---|---|---|
| EP | 3209070 A1 | 8/2017 |
| EP | 3280203 A1 | 2/2018 |
| EP | 3410788 A1 | 12/2018 |

OTHER PUBLICATIONS

International Search Report and Written Opinion—PCT/US2019/068006—ISA/EPO—dated Jun. 24, 2020.

(Continued)

*Primary Examiner* — Ayaz R Sheikh
*Assistant Examiner* — Faiyazkhan Ghafoerkhan
(74) *Attorney, Agent, or Firm* — Alan Gordon

(57) ABSTRACT

Methods, systems, and devices for wireless communications are described for adjusting transmit powers for concurrent uplink transmissions from a user equipment (UE) to multiple transmission reception points (TRPs), or dropping one or more uplink transmissions to one or more TRPs, based on one or more parameters. A UE may identify that a combined transmission power for concurrent uplink transmissions exceeds a power threshold of the UE, and may adjust a power for one or more of the concurrent uplink transmissions, or drop one or more of the uplink transmissions based on such an identification. If a difference in transmit powers of the concurrent uplink transmissions exceeds a power difference threshold, the UE may drop one or more lower priority transmissions. The UE may multiplex at least a (Continued)

portion of a dropped transmission with another uplink transmission that will be transmitted, such as by rate-matching or puncturing.

14 Claims, 21 Drawing Sheets

(56) References Cited

U.S. PATENT DOCUMENTS

| | | | | |
|---|---|---|---|---|
| 2014/0362814 | A1* | 12/2014 | Haim | H04W 52/16 |
| | | | | 370/329 |
| 2018/0310257 | A1* | 10/2018 | Papasakellariou | H04W 52/50 |
| 2019/0052339 | A1* | 2/2019 | Zhou | H04B 17/309 |
| 2019/0159135 | A1* | 5/2019 | MolavianJazi | H04W 52/10 |
| 2019/0159136 | A1* | 5/2019 | MolavianJazi | H04L 5/001 |
| 2019/0174440 | A1* | 6/2019 | Kwak | H04W 56/0015 |
| 2019/0182682 | A1* | 6/2019 | Kim | H04W 74/08 |
| 2019/0245661 | A1* | 8/2019 | Baldemair | H04L 1/1854 |
| 2019/0363843 | A1* | 11/2019 | Gordaychik | H04W 52/54 |
| 2019/0394805 | A1* | 12/2019 | Kim | H04W 52/50 |
| 2020/0007296 | A1* | 1/2020 | Papasakellariou | H04L 1/1861 |
| 2020/0052743 | A1* | 2/2020 | Ryu | H04B 7/0632 |
| 2020/0053657 | A1* | 2/2020 | MolavianJazi | H04W 52/281 |
| 2020/0053710 | A1* | 2/2020 | MolavianJazi | H04W 52/16 |
| 2020/0053724 | A1* | 2/2020 | MolavianJazi | H04W 72/10 |
| 2020/0059867 | A1* | 2/2020 | Haghighat | H04W 52/42 |
| 2020/0137695 | A1* | 4/2020 | Papasakellariou | H04W 52/08 |
| 2020/0145062 | A1* | 5/2020 | Jung | H04W 72/1289 |
| 2020/0145079 | A1* | 5/2020 | Marinier | H04B 7/0404 |
| 2020/0274656 | A1* | 8/2020 | Gordaychik | H04L 1/1896 |
| 2021/0282143 | A1* | 9/2021 | Lee | H04W 76/14 |
| 2021/0336688 | A1* | 10/2021 | Lee | H04W 76/18 |

OTHER PUBLICATIONS

CATT: "Remaining Issues of NR Power Control," 3GPP Draft, 3GPP TSG RAN WG1 Meeting #94, R1-1808384_PC, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20-Aug. 24, 2018, Aug. 11, 2018 (Aug. 11, 2018), XP051515766, 5 pages, Retrieved from the Internet:URL:http://www.3gpp.org/ftp/tsg%5Fran/WG1%5FRL1/TSGR1%5F94/Docs/R1%2D1808384%2Ezip [retrieved on Aug. 11, 2018], section 2.

Partial International Search Report—PCT/US2019/068006—ISA/EPO—dated Apr. 22, 2020.

* cited by examiner

TECHNIQUES FOR CONCURRENT UPLINK TRANSMISSIONS TO MULTIPLE TRANSMISSION RECEPTION POINTS

CROSS REFERENCE

The present Application for Patent claims the benefit of U.S. Provisional Patent Application No. 62/784,034 by JOHN WILSON et al., entitled "TECHNIQUES FOR CONCURRENT UPLINK TRANSMISSIONS TO MULTIPLE TRANSMISSION RECEPTION POINTS," filed Dec. 21, 2018, assigned to the assignee hereof, and expressly incorporated herein.

BACKGROUND

The following relates generally to wireless communications, and more specifically to techniques for concurrent uplink transmissions to multiple transmission reception points.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some systems, a UE may communicate with multiple transmission reception points (TRPs). Such multi-TRP communications may include concurrent downlink transmissions from multiple TRPs to a UE, and also may include concurrent uplink transmissions from the UE to two or more TRPs. When communications include concurrent uplink transmissions, a UE may encounter uplink power constraints due to aggregate transmission powers of the uplink transmissions reaching or exceeding a maximum uplink power of the UE. Further, in some cases the TRPs receiving concurrent uplink communications may have backhaul communications links that do not support close coordination of the TRPs, and thus the TRPs in some cases may not be capable of coordinating uplink transmissions from the UE or performing immediate exchange of information related to current UE conditions.

SUMMARY

The described techniques relate to improved methods, systems, devices, and apparatuses that support techniques for concurrent uplink transmissions to multiple transmission reception points (TRPs). Various aspects of the disclosure describe techniques for adjusting transmit powers for concurrent uplink transmissions from a user equipment (UE) to multiple TRPs, or dropping one or more uplink transmissions to one or more TRPs, based on one or more parameters. In some cases, a UE may identify that a combined transmission power for concurrent uplink transmissions exceeds a power threshold of the UE, and may adjust a power for one or more of the concurrent uplink transmissions, or drop one or more of the uplink transmissions based on such an identification. In some cases, the UE may adjust a transmit power of one or more of the concurrent uplink transmissions based on a channel priority associated with each uplink transmission, with higher priority channels having lower or no power adjustments compared to lower priority channels. In some cases, if a difference in transmit powers of the concurrent uplink transmissions exceeds a power difference threshold, the UE may drop one or more lower priority transmissions. In some cases, the UE may multiplex at least a portion of a dropped transmission with another uplink transmission that will be transmitted. Such multiplexing may include rate-matching or puncturing techniques.

A method of wireless communication at a UE is described. The method may include identifying that a combined transmission power for concurrent transmissions of a first communication to a first TRP and a second communication to a second TRP exceeds a power threshold of the UE, determining whether to reduce a transmission power of one or more of the first communication or the second communication, or to drop one of the first communication or the second communication, based on the combined transmission power exceeding the power threshold, and transmitting one or more of the first communication or the second communication based on the determining.

An apparatus for wireless communication at a UE is described. The apparatus may include a processor, memory in electronic communication with the processor, and instructions stored in the memory. The instructions may be executable by the processor to cause the apparatus to identify that a combined transmission power for concurrent transmissions of a first communication to a first TRP and a second communication to a second TRP exceeds a power threshold of the UE, determine whether to reduce a transmission power of one or more of the first communication or the second communication, or to drop one of the first communication or the second communication, based on the combined transmission power exceeding the power threshold, and transmit one or more of the first communication or the second communication based on the determining.

Another apparatus for wireless communication at a UE is described. The apparatus may include means for identifying that a combined transmission power for concurrent transmissions of a first communication to a first TRP and a second communication to a second TRP exceeds a power threshold of the UE, determining whether to reduce a transmission power of one or more of the first communication or the second communication, or to drop one of the first communication or the second communication, based on the combined transmission power exceeding the power threshold, and transmitting one or more of the first communication or the second communication based on the determining.

A non-transitory computer-readable medium storing code for wireless communication at a UE is described. The code may include instructions executable by a processor to identify that a combined transmission power for concurrent transmissions of a first communication to a first TRP and a second communication to a second TRP exceeds a power threshold of the UE, determine whether to reduce a transmission power of one or more of the first communication or the second communication, or to drop one of the first communication or the second communication, based on the combined transmission power exceeding the power threshold, and transmit one or more of the first communication or the second communication based on the determining.

In some examples of the method, apparatuses, and non-transitory computer-readable medium described herein, the determining may include operations, features, means, or instructions for determining to reduce the transmission power of one or more of the first communication or the second communication when a difference between the first adjusted transmission power and the second adjusted transmission power may be less than or equal to a power difference threshold, and determining to drop one or the first communication or the second communication when the difference between the first adjusted transmission power and the second adjusted transmission power exceeds the power difference threshold.

In some examples of the method, apparatuses, and non-transitory computer-readable medium described herein, the determining may include operations, features, means, or instructions for identifying a first traffic priority of the first communication and a second traffic priority of the second communication, determining a first power reduction factor for the first communication based on the first traffic priority and a second power reduction factor for the second communication based on the second traffic priority, and applying the first power reduction factor to a first initial transmission power of the first communication to obtain a first adjusted transmission power and the second power reduction factor to a second initial transmission power of the second communication to obtain a second adjusted transmission power.

In some examples of the method, apparatuses, and non-transitory computer-readable medium described herein, the first traffic priority and the second traffic priority may be identified based on one or more of a control resource set (CORESET) identification associated with the first communication and the second communication, a RRC configuration, a type of data to be transmitted in the first communication and the second communication, or any combinations thereof.

In some examples of the method, apparatuses, and non-transitory computer-readable medium described herein, the determining may include operations, features, means, or instructions for determining to drop the first communication, and where the method further includes, and multiplexing at least a portion of information to be transmitted in the first communication into the second communication.

In some examples of the method, apparatuses, and non-transitory computer-readable medium described herein, the first communication may have a lower traffic priority than the second communication, and where the portion of information to be transmitted in the first communication includes control information associated with the first communication. In some examples of the method, apparatuses, and non-transitory computer-readable medium described herein, the first communication may be an enhanced mobile broadband (eMBB) communication and the second communication may be an ultra-reliable low latency communication (URLLC), and where a URLLC codebook accommodates transmission of eMBB control information with a URLLC communication.

In some examples of the method, apparatuses, and non-transitory computer-readable medium described herein, the multiplexing may include operations, features, means, or instructions for rate-matching first uplink control information of the first communication around second uplink control information of the second communication, and rate-matching uplink data of the second communication around the first uplink control information and the second uplink control information.

In some examples of the method, apparatuses, and non-transitory computer-readable medium described herein, the multiplexing may include operations, features, means, or instructions for puncturing a portion of the second communication with first uplink control information of the first communication.

In some examples of the method, apparatuses, and non-transitory computer-readable medium described herein, the multiplexing further may include operations, features, means, or instructions for transmitting an indication to the second TRP that indicates that the portion of information to be transmitted in the first communication may be multiplexed into the second communication, and where the indication further indicates rate-matching or puncturing of the second communication.

In some examples of the method, apparatuses, and non-transitory computer-readable medium described herein, the indication to the second TRP indicates one or more of a payload size, a length, a resource element location, or any combinations thereof, of the portion of information to be transmitted in the first communication may be multiplexed into the second communication. In some examples of the method, apparatuses, and non-transitory computer-readable medium described herein, the indication to the second TRP may be transmitted in a subsequent uplink communication with the second TRP that may be transmitted after the second communication. In some examples of the method, apparatuses, and non-transitory computer-readable medium described herein, the indication to the second TRP may be transmitted in a medium access control (MAC) control element (MAC-CE) or in an uplink control information transmission to the second TRP.

A method of wireless communication at a first TRP is described. The method may include establishing a connection with a UE that is configured for concurrent uplink transmissions with the first TRP and a second TRP, receiving a first uplink communication from the UE, determining, based on an indication provided by the UE, that the first uplink communication includes multiplexed data from a second uplink communication associated with the second TRP, and providing the multiplexed data to the second TRP.

An apparatus for wireless communication at a first TRP is described. The apparatus may include a processor, memory in electronic communication with the processor, and instructions stored in the memory. The instructions may be executable by the processor to cause the apparatus to establish a connection with a UE that is configured for concurrent uplink transmissions with the first TRP and a second TRP, receive a first uplink communication from the UE, determine, based on an indication provided by the UE, that the first uplink communication includes multiplexed data from a second uplink communication associated with the second TRP, and provide the multiplexed data to the second TRP.

Another apparatus for wireless communication at a first TRP is described. The apparatus may include means for establishing a connection with a UE that is configured for concurrent uplink transmissions with the first TRP and a second TRP, receiving a first uplink communication from the UE, determining, based on an indication provided by the UE, that the first uplink communication includes multiplexed data from a second uplink communication associated with the second TRP, and providing the multiplexed data to the second TRP.

A non-transitory computer-readable medium storing code for wireless communication at a first TRP is described. The code may include instructions executable by a processor to establish a connection with a UE that is configured for concurrent uplink transmissions with the first TRP and a second TRP, receive a first uplink communication from the UE, determine, based on an indication provided by the UE, that the first uplink communication includes multiplexed data from a second uplink communication associated with the second TRP, and provide the multiplexed data to the second TRP.

Some examples of the method, apparatuses, and non-transitory computer-readable medium described herein may further include operations, features, means, or instructions for configuring the UE to transmit the multiplexed data in the first uplink communication according to a first traffic priority of the first uplink communication and a second traffic priority of the second uplink communication.

In some examples of the method, apparatuses, and non-transitory computer-readable medium described herein, the configuring the UE includes configuring the UE to reduce a transmission power of one or more of the first uplink communication or the second uplink communication based on a transmission power threshold or to drop one or the first uplink communication or the second uplink communication based on a difference in transmission powers of the first uplink communication and the second uplink communication exceeding a power difference threshold.

In some examples of the method, apparatuses, and non-transitory computer-readable medium described herein, the first traffic priority and the second traffic priority may be identified based on one or more of a CORESET identification associated with the first communication and the second communication, a RRC configuration, a type of data to be transmitted in the first communication and the second communication, or any combinations thereof.

In some examples of the method, apparatuses, and non-transitory computer-readable medium described herein, the second uplink communication may have a lower traffic priority than the first uplink communication, and where the multiplexed data from the second uplink communication includes control information associated with the second uplink communication. In some examples of the method, apparatuses, and non-transitory computer-readable medium described herein, the second uplink communication may be an eMBB communication and the first uplink communication may be an URLLC, and where a URLLC codebook accommodates transmission of eMBB control information with a URLLC communication.

In some examples of the method, apparatuses, and non-transitory computer-readable medium described herein, the multiplexed data may include operations, features, means, or instructions for second uplink control information of the second uplink communication that may be rate-matched around first uplink control information of the first uplink communication, and uplink data of the first uplink communication that may be rate-matched around the first uplink control information and the second uplink control information.

In some examples of the method, apparatuses, and non-transitory computer-readable medium described herein, a portion of the first communication may be punctured with second uplink control information of the second uplink communication. In some examples of the method, apparatuses, and non-transitory computer-readable medium described herein, the determining may include operations, features, means, or instructions for receiving the indication from the UE that indicates that the first uplink communication includes the multiplexed data, and where the indication further indicates rate-matching or puncturing of the first uplink communication.

In some examples of the method, apparatuses, and non-transitory computer-readable medium described herein, the indication from the UE indicates one or more of a payload size, a length, a resource element location, or any combinations thereof, of the multiplexed data. In some examples of the method, apparatuses, and non-transitory computer-readable medium described herein, the indication from the UE may be transmitted in a subsequent uplink communication to the first TRP that may be transmitted after the first uplink communication. In some examples of the method, apparatuses, and non-transitory computer-readable medium described herein, the indication may be transmitted in a MAC-CE or in an uplink control information transmission.

DETAILED DESCRIPTION

Figure 1:
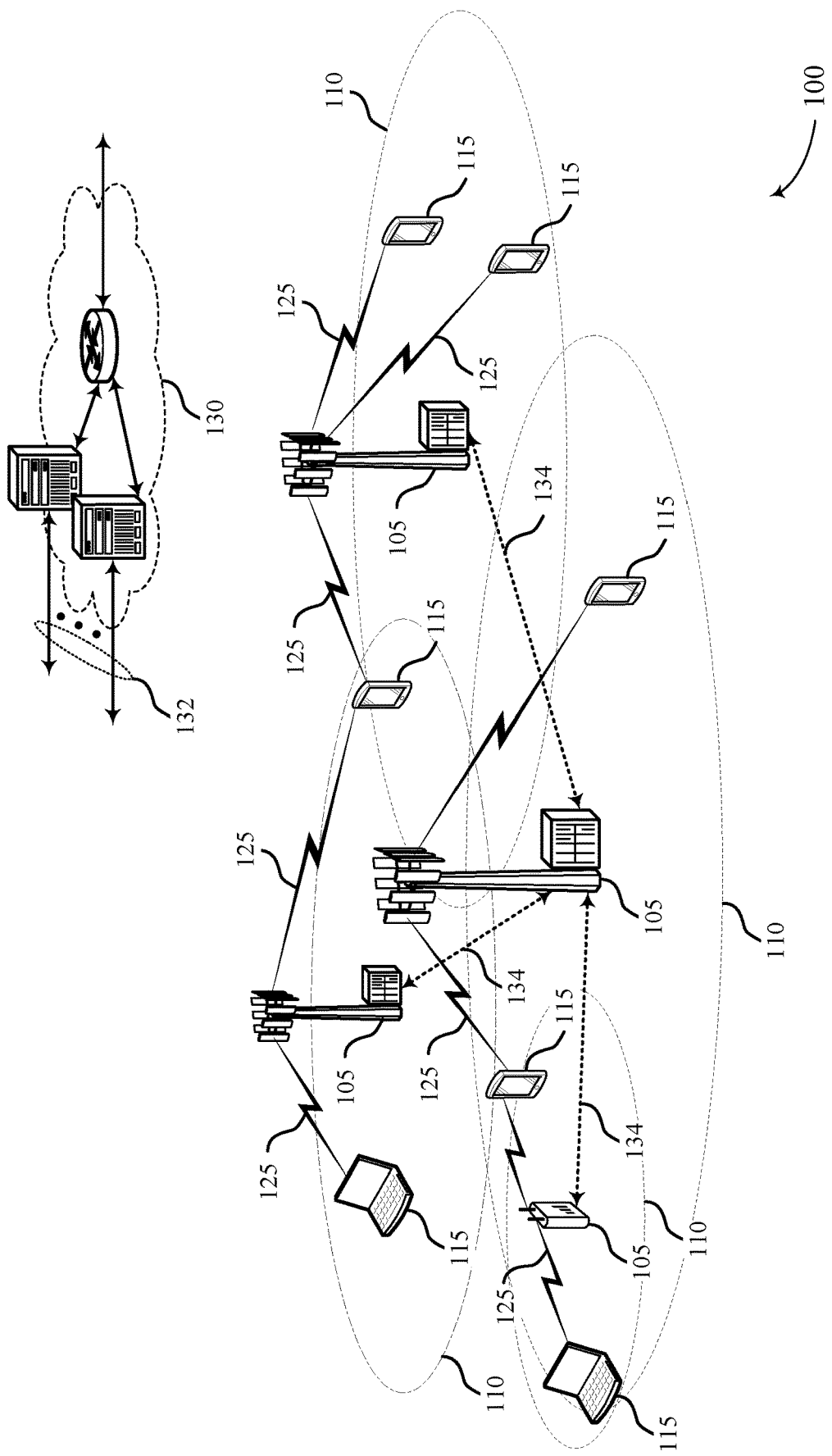
FIG. 1 illustrates an example of a system for wireless communications that supports techniques for concurrent uplink transmissions to multiple transmission reception points (TRPs) in accordance with aspects of the present disclosure.

Various aspects of the present disclosure provide techniques for concurrent uplink transmissions to multiple transmission reception points (TRPs). According to some aspects, a user equipment (UE) may be configured for multiple concurrent uplink transmissions to multiple TRPs. The UE may, in some cases, adjust transmit powers for the concurrent uplink transmissions, or drop one or more of the uplink transmissions, based on one or more parameters. In some cases, a UE may identify that a combined transmission power for concurrent uplink transmissions exceeds a power threshold of the UE, and may adjust a power for one or more of the concurrent uplink transmissions, or drop one or more of the uplink transmissions, based on such an identification. In some cases, the UE may adjust a transmit power of one or more of the concurrent uplink transmissions based on a channel priority associated with each uplink transmission, with higher priority channels having lower or no power adjustments compared to lower priority channels. In some cases, if a difference in transmit powers of the concurrent uplink transmissions exceeds a power difference threshold, the UE may drop one or more lower priority transmissions.

In some cases, the UE may multiplex at least a portion of a dropped transmission with another uplink transmission that will be transmitted. For example, if the UE is configured for a first uplink transmission to a first TRP and a concurrent second uplink transmission to a second TRP, and determines to drop the first uplink transmission, all or a portion of the first uplink transmission may be multiplexed with the second uplink transmission and transmitted to the second TRP. In some cases, the UE may rate-match a portion of the first uplink transmission into the second uplink transmission. For example, the UE may rate match first uplink control information (UCI) of the first uplink transmission around second UCI of the second uplink transmission (e.g., in a physical uplink control channel (PUCCH)), and may then rate-match data (e.g., physical uplink shared channel (PUSCH) data) around the first UCI and second UCI. In other cases, the UE may puncture some resources of the second uplink transmission with a portion of the first uplink transmission. Further, in some cases, the UE may provide an indication to the second TRP that indicates that the UE multiplexed a portion of the first uplink transmission with the second uplink transmission. In some cases, the indication may be provided with the second uplink transmission. In other cases, the indication may be provided in a subsequent uplink transmission to the second TRP that is after the second uplink transmission. The second TRP may decode and demultiplex the second uplink transmission, and provide information associated with the first TRP to the first TRP via the backhaul link.

In some cases, one or more TRPs may not have a backhaul connection with sufficient resources or bandwidth to support close coordination between TRPs that may receive concurrent uplink transmissions from a UE. Backhaul links that do not support close coordination of TRPs may be referred to as non-ideal backhaul links. In cases where TRPs have non-ideal backhaul links, the TRPs may be unable to coordinate uplink transmissions from the UE. For example, a first TRP may have allocated uplink resources for a lower priority communications channel (e.g., for enhanced mobile broadband (eMBB) communications) and a second TRP, after the first TRP has allocated the uplink resources, may allocate uplink resources for a higher priority communications channel (e.g., for ultra-reliable low-latency communications (URLLC). In cases where the TRPs have non-ideal backhaul, the TRPs may not be able to coordinate and indicate to the UE that the lower priority communications may be adjusted in order to provide higher reliability for the higher priority communications channel. A UE operating in accordance with techniques discussed herein, may adjust a transmission power, or drop a transmission, for a lower priority channel when a concurrent uplink transmission of a higher priority channel is scheduled.

Accordingly, such techniques may allow for UE communications with multiple TRPs in which two or more concurrent uplink transmissions (e.g., using MIMO techniques, different antenna panels at the UE, dual connectivity techniques, etc.) may be managed to efficiently and reliably use available uplink resources and available UE resources in systems that may have ideal or non-ideal backhaul links. Such techniques may enhance the reliability and capacity of a system. Further, such techniques may allow for more efficient resource utilization by allowing TRPs that have available resources to schedule lower priority communications with a UE in the uplink with little coordination with other TRPs (e.g., due to a non-ideal backhaul link) that may schedule higher priority communications with the UE. Higher priority communications may continue to be reliably communicated in such cases, while lower priority communications may use available resources with relatively little, if any, impact on the higher priority communications reliability.

Aspects of the disclosure are initially described in the context of a wireless communications system. Aspects of the disclosure are further illustrated by and described with reference to apparatus diagrams, system diagrams, and flowcharts that relate to techniques for concurrent uplink transmissions to multiple TRPs.

FIG. 1 illustrates an example of a wireless communications system 100 that supports techniques for concurrent uplink transmissions to multiple TRPs in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, a UE 115 may be configured for multiple concurrent uplink transmissions to multiple base stations 105, which may be referred to interchangeably as TRPs 105 herein. The UE 115 may, in some cases, adjust transmit powers for the concurrent uplink transmissions, or drop one or more of the uplink transmissions, based on one or more parameters. In some cases, the UE 115 may identify that a combined transmission power for concurrent uplink transmissions exceeds a power threshold of the UE 115 (e.g., the aggregate transmission powers exceed a $P_{cmax}$ of the UE 115), and may adjust a power for one or more of the concurrent uplink transmissions, or drop one or more of the uplink transmissions based on such an identification. In some cases, the UE 115 may adjust a transmit power of one or more of the concurrent uplink transmissions based on a channel priority associated with each uplink transmission. In some cases, if a difference in transmit powers of the concurrent uplink transmissions exceeds a power difference threshold, the UE 115 may drop one or more lower priority transmissions. In some cases, the UE 115 may multiplex at least a portion of a dropped transmission with another uplink transmission that will be transmitted.

Figure 2:
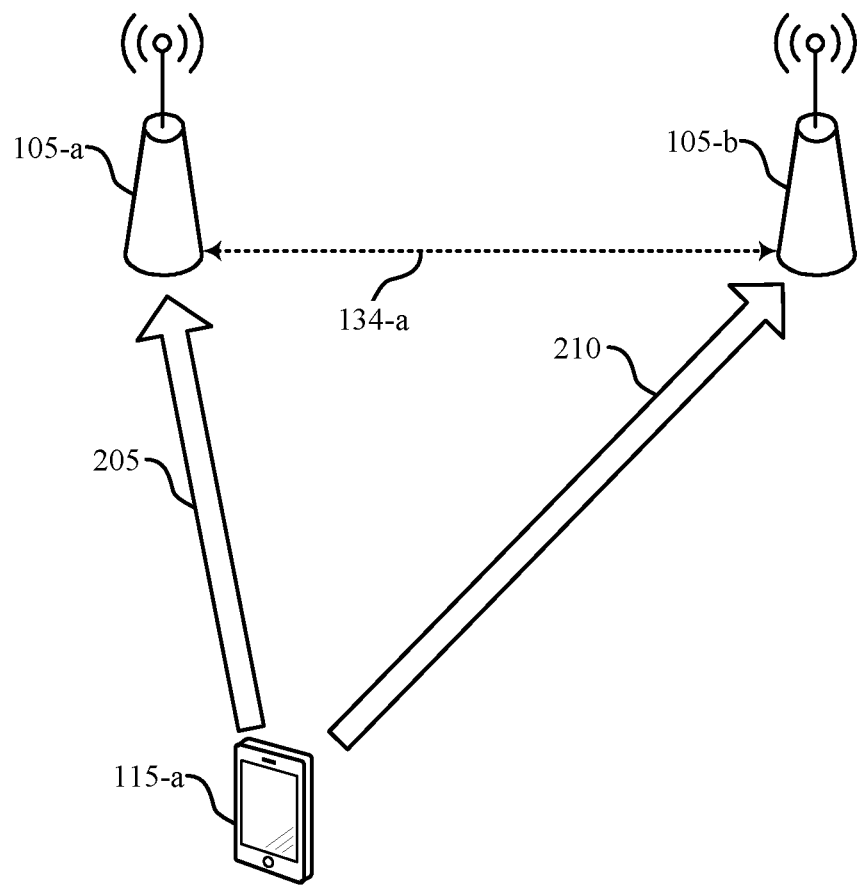
FIG. 2 illustrates an example of a portion of a wireless communications system that supports techniques for concurrent uplink transmissions to multiple TRPs in accordance with aspects of the present disclosure.

FIG. 2 illustrates an example of a wireless communications system 200 that supports techniques for concurrent uplink transmissions to multiple TRPs in accordance with aspects of the present disclosure. In some examples, wireless communications system 200 may implement aspects of wireless communications system 100. The wireless communications system 200 may include a first TRP 105-*a*, a second TRP 105-*b*, and UE 115-*a*, which may be examples of the corresponding devices described with reference to FIG. 1. In this example, TRPs 105 may communicate with each other via a backhaul link 134*a* (either directly of via a core network). In this case, the UE 115-*a* may have multiple concurrent connections, including a first connection that supports a first uplink transmission 205 with the first TRP 105-*a* and a second connection that supports a second uplink transmission 210 with the second TRP 105-*b*. In this example, the backhaul link 134*a* may provide an ideal or non-ideal backhaul, and techniques provided herein may be used in cases that have either ideal or non-ideal backhaul.

The UE 115-*a* may establish connections with the TRPs 105 and as part of the associated connection establishment procedures, or after the connections are established, may receive or identify a configuration for concurrent uplink transmissions. In some cases, one or both of the TRPs 105 may transmit configuration information to the UE 115-*a* that indicates power scaling or transmission dropping processes that are to be used at the UE 115-*a*. In some cases, transmission dropping may be performed in conjunction with multiplexing of data from the dropped transmission with the maintained transmission. Such multiplexing may include, for example, multiplexing of first PUCCH information for the first TRP 105-a with second PUCCH information for the second TRP 105-b, multiplexing of the first PUCCH information with second PUSCH information for the second TRP 105-b, multiplexing first PUSCH information for the first TRP 105-a with the second PUSCH information (the PUSCH information may include UCI), or any combinations thereof. Power scaling or dropping of transmissions may be performed due to, for example, transmission power limitations, quality of service (QOS) constraints, channel priorities, and the like.

In some cases, the UE 115-a may determine a calculated transmission power for the first uplink transmission 205 and for the second uplink transmission 210, that are scheduled to be concurrently transmitted by the UE 115-b. In cases where an aggregated uplink transmission power of both of the uplink transmissions does not exceed a transmit power threshold of the UE 115-a, the UE 115-a may simply transmit each uplink transmission in accordance with the calculated transmission power. In cases where the aggregated uplink power does exceed the transmit power threshold, the UE 115-a may perform power reduction on one or both of the first uplink transmission 205 or the second uplink transmission 210.

In some cases, the respective uplink transmit powers may be scaled equally to provide an aggregate uplink transmit power that corresponds to the transmit power threshold. In other cases, power reduction for each uplink transmission may be performed in accordance with a power reduction factor. Such a power reduction factor may be determined for each uplink transmission as a function of, for example, a priority of the traffic of the uplink transmission (e.g., URLLC versus eMBB), a type of traffic of the uplink transmission (e.g., PUSCH data, ACK/NACK feedback, UCI, etc.), or any combinations thereof. In some cases, one of the TRPs 105 may provide configuration information that may be used to determine the scaling factor to be applied, or such scaling factors may be predetermined and known at the UE 115-b. In some cases, scaling factors may be defined for multiple different combinations of channel priorities and traffic types. For example, if the first uplink transmission 205 is an eMBB transmission with eMBB PUSCH data, and the second uplink transmission 210 is a URLLC transmission with URLLC UCI, the scaling factors may provide a large power reduction for the first uplink transmission 205 and a relatively small, or no, power reduction for the second uplink transmission 210. In some cases, the power scaling factors may simply indicate that one or more transmissions should be dropped based on relative differences in channel priorities and traffic types (e.g., eMBB PUSCH transmissions are dropped in favor of URLLC transmissions, eMBB ACK/NACK transmission power may be scaled by a smaller power reduction factor than a concurrent eMBB PUSCH transmission, etc.).

In some cases, if a difference between a first scaled transmission power for the first uplink transmission 205 and a second scaled transmission power for the second uplink transmission 210 exceeds a power difference threshold (i.e., one transmission is to be transmitted at very low power), then one of the transmissions may be dropped. In some cases, one or more dropping rules may be configured at the UE 115-a, which may be a function of a QOS of the traffic, type of traffic, channel priority, and the like. In some cases, the priority of traffic may be implicitly determined, such as based on a control resource set (CORESET) identification (e.g., different CORESET IDs may be associated with URLLC and eMBB traffic), or may be configured at the UE 115-a, such as via RRC signaling.

In some cases, when an uplink transmission is dropped, the UE 115-a may multiplex the dropped signal with another uplink transmission. For example, if the UE 115-a determines to drop the first uplink transmission 205, all or a portion of the information to be transmitted in the first uplink transmission 205 may be multiplexed into the second uplink transmission 210. For example, a first PUCCH to be transmitted in the first uplink transmission 205 may be multiplexed with a second PUCCH that is to be transmitted in the second uplink transmission 210, or the first PUCCH may be multiplexed with a second PUSCH of the second uplink transmission 210. In some cases, different types of communications may be multiplexed (e.g., eMBB PUCCH could be multiplexed with URLLC PUCCH). In such cases, codebooks of the different communications types (e.g., a URLLC codebook) may be designed to allow multiplexing of information of another communication type. In some cases, lower priority communications (e.g., eMBB) may be multiplexed with higher priority communications (e.g., URLLC), but not the other way around due to reliability targets of the higher priority communications. In cases where multiplexing is used for all or a portion of a dropped uplink transmission, such multiplexing may include rate-matching or puncturing, as will be discussed in more detail with respect to FIGS. 3 and 4. Further, in some cases, when UE 115-a multiplexes data, an indication of the multiplexing may be provided, as will be discussed in more detail with respect to FIG. 5.

Figure 3:
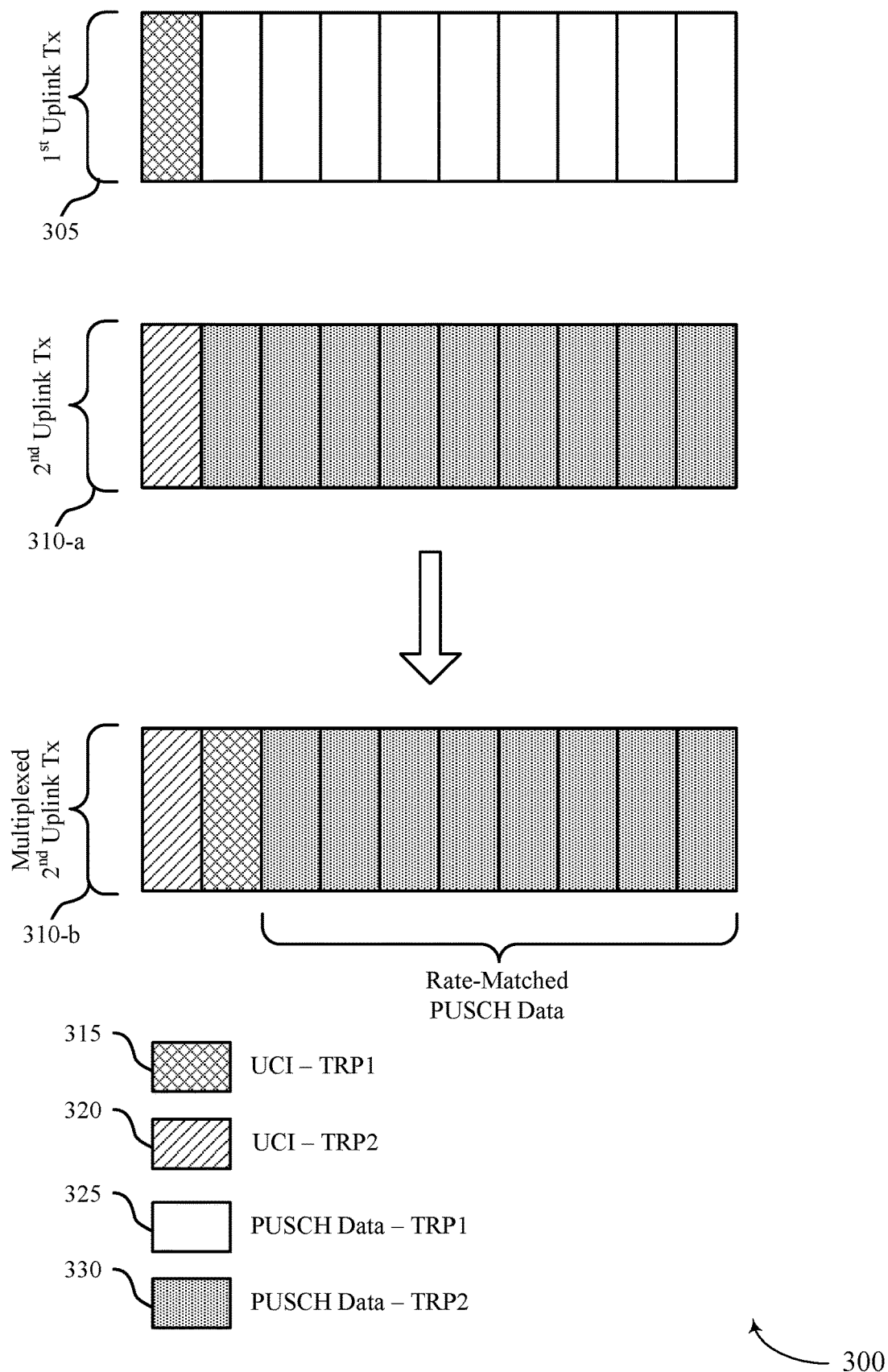
FIG. 3 illustrates an example of a rate-matching process that supports techniques for concurrent uplink transmissions to multiple TRPs in accordance with aspects of the present disclosure.

FIG. 3 illustrates an example of a rate-matching process 300 that supports techniques for concurrent uplink transmissions to multiple TRPs in accordance with aspects of the present disclosure. In some examples, rate-matching process 300 may implement aspects of wireless communications system 100 or 200. In the example of FIG. 3, a UE (e.g., a UE 115 of FIG. 1 or 2) may be scheduled with a first uplink transmission 305 and a second uplink transmission 310-a.

In this case, the first uplink transmission 305 may include first UCI 315 for a first TRP, and first PDSCH data 325 for the first TRP. Likewise, the second uplink transmission 310-a may include second UCI 320 for a second TRP, and second PUSCH data 330 for the second TRP. In this example, the UE may determine that the first uplink transmission 305 is to be dropped, and that the first UCI 315 is to be rate-matched into the second uplink transmission 310-a. In this case, the UE may generate a modified second uplink transmission 310-b, in which the first UCI 315 is rate-matched around the second UCI 320, and then the second PUSCH data 330 is rate-matched around the first UCI 315 and the second UCI 320. The modified second uplink transmission 310-b may then be transmitted by the UE to the second TRP. In some deployments, rate-matching can be beneficial in cases where the TRPs have an ideal backhaul link.

Figure 4:
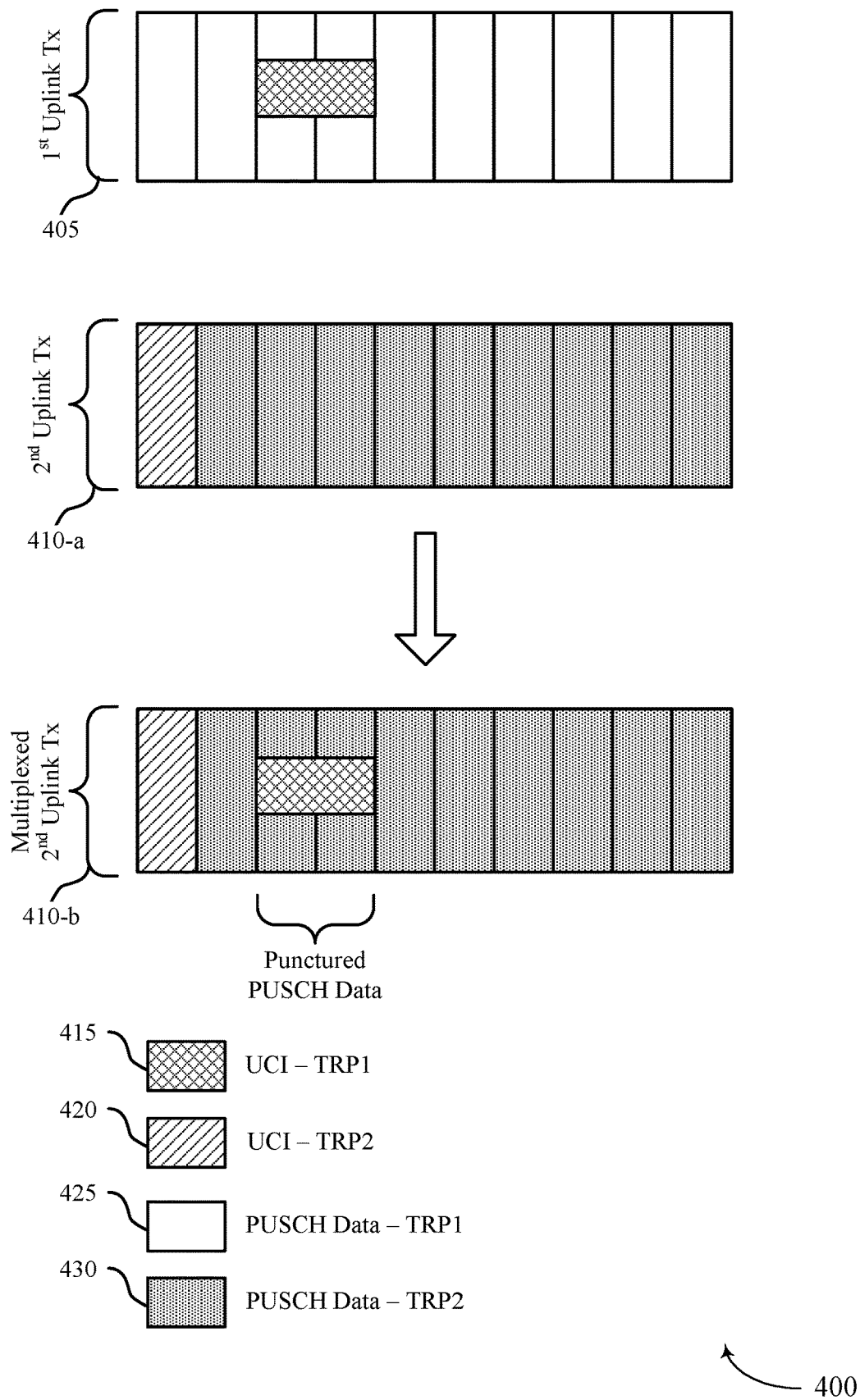
FIG. 4 illustrates an example of a puncturing process that supports techniques for concurrent uplink transmissions to multiple TRPs in accordance with aspects of the present disclosure.

FIG. 4 illustrates an example of a puncturing process 400 that supports techniques for concurrent uplink transmissions to multiple TRPs in accordance with aspects of the present disclosure. In some examples, puncturing process 400 may implement aspects of wireless communications system 100 or 200. In the example of FIG. 4, a UE (e.g., a UE 115 of FIG. 1 or 2) may be scheduled with a first uplink transmission 405 and a second uplink transmission 410-a.

In this case, the first uplink transmission 405 may include first UCI 415 for a first TRP, and first PDSCH data 425 for the first TRP. Likewise, the second uplink transmission 410-a may include second UCI 420 for a second TRP, and second PUSCH data 430 for the second TRP. In this example, the UE may determine that the first uplink transmission 405 is to be dropped, and that the second PUSCH 430 is to be punctured with the first UCI 415. In this case, the UE may generate a modified second uplink transmission 410-b, in which the first UCI 415 is punctured into the data REs of second PUSCH 430. The modified second uplink transmission 410-b may then be transmitted by the UE to the second TRP. In some deployments, puncturing can be beneficial in cases where the TRPs have a non-ideal backhaul link.

Figure 5:
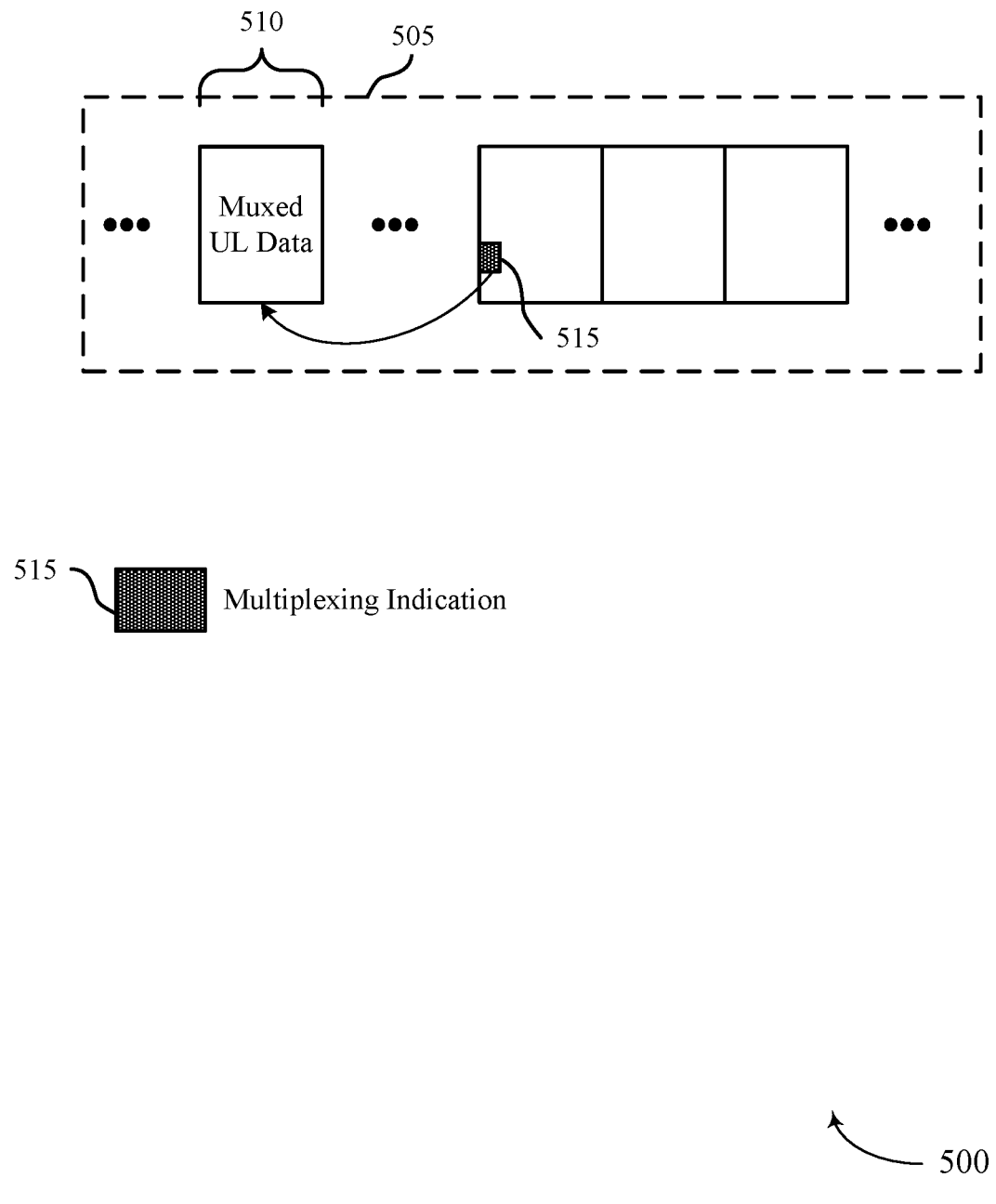
FIG. 5 illustrates an example of a multiplexing indication that supports techniques for concurrent uplink transmissions to multiple TRPs in accordance with aspects of the present disclosure.

FIG. 5 illustrates an example of a multiplexing indication 500 that supports techniques for concurrent uplink transmissions to multiple TRPs in accordance with aspects of the present disclosure. In some examples, multiplexing indication 500 may implement aspects of wireless communications system 100 or 200. In discussed above, in some cases a UE may provide signaling that an uplink transmission is multiplexed with another uplink transmission.

In this example, a second uplink transmission 505 to a second TRP may include multiplexed uplink data 510 of a first uplink transmission of a first TRP. In this example, a multiplexing indication 515 may be provided that indicates to the second TRP that the multiplexed uplink data 510 is present. Further, in this example, the multiplexing indication 515 may be provided in a transmission that is subsequent to the transmission with the multiplexed data. The receiving second TRP, in such cases, may buffer the uplink transmission and decode in accordance with the multiplexing indication 515. In other cases, the multiplexing indication 515 may be provided in a same transmission as the multiplexed uplink data 510 (e.g., in UCI of the uplink transmission). In some cases, the multiplexing indication 515 may indicate a payload size/length/RE location of the multiplexed data, whether the multiplexing uses rate-matching or puncturing, or any combinations thereof. In some cases, the multiplexing indication 515 may be carried in UCI or in a medium access control (MAC) control element (CE).

Figure 6:
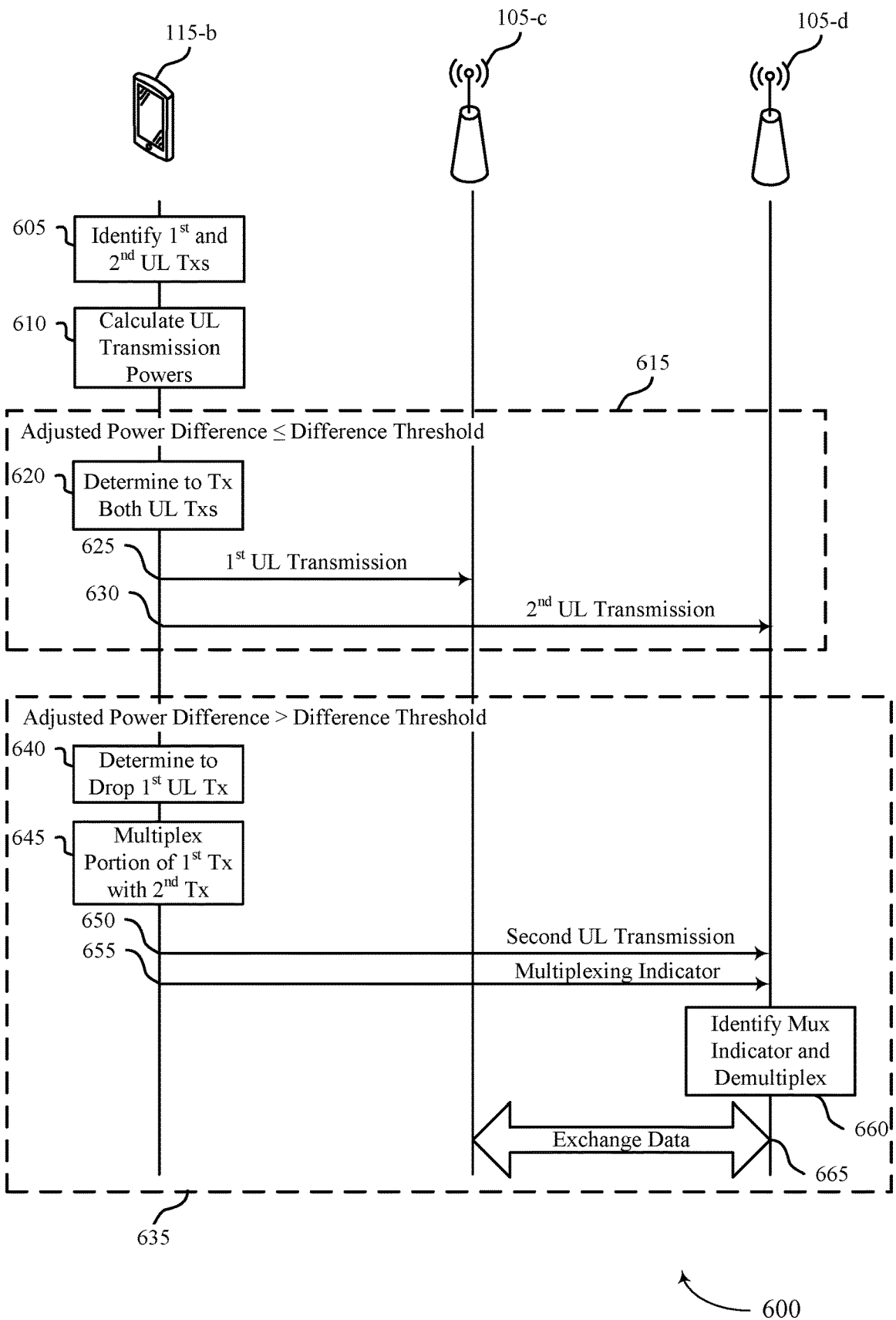
FIG. 6 illustrates an example of a process flow that supports techniques for concurrent uplink transmissions to multiple TRPs in accordance with aspects of the present disclosure.

FIG. 6 illustrates an example of a process flow 600 that supports techniques for concurrent uplink transmissions to multiple TRPs in accordance with aspects of the present disclosure. In some examples, process flow 600 may implement aspects of wireless communications systems 100 and 200. For instance, process flow 600 may be implemented by TRPs 105 and UE 115, as described with reference to wireless communications systems 100 and 200. The process flow 600 may include a UE 115-b, a first TRP 105-c, and a second TRP 105-d, which may be examples of the corresponding devices described with reference to FIGS. 1 and 2. TRPs 105 and UE 115-b may implement one or more techniques for concurrent uplink transmissions as discussed herein. Alternative examples of the following may be implemented, where some steps are performed in a different order than described or are not performed at all. In some cases, steps may include additional features not mentioned below, or further steps may be added.

At 605, the UE 115-b may identify a first uplink transmission and a second uplink transmission that are to be concurrently transmitted to the TRPs 105. The first and second uplink transmissions may be identified based on uplink scheduling provided by the respective TPRs 105, for example.

At 610, the UE 115-b may calculate uplink transmission powers for the first uplink transmission and the second uplink transmission. The UE 115-b may also determine whether an aggregated uplink transmission power of each of the uplink transmissions exceeds a maximum power threshold of the UE 115-b. If the aggregated uplink transmission power does not exceed the maximum power threshold, the UE 115-b simply transmit each uplink transmission in accordance with the calculated uplink transmission power. In cases where the aggregates uplink transmission power does exceed the maximum power threshold, the UE 115-b may perform power scaling or dropping in accordance with various techniques discussed herein.

In some cases, the UE 115-b may perform power scaling of each uplink transmission as indicated at 615. In such cases, at 620, the UE 115-b may determine to transmit both uplink transmissions. The UE 115-b may make such a determination based on one or more parameters, such as an amount of scaling needed for each transmission, a channel priority of each transmission, a type of data to be transmitted in each transmission, and the like. The UE 115-b may perform power reductions of one or both of the transmissions based on the determined amount of scaling. At 625, the UE 115-b may transmit the first uplink transmission to the first TRP 105-c. At 630, the UE 115-b may transmit the second uplink transmission to the second TRP 105-d.

In cases where the UE 115-b determines to drop an uplink transmission, the UE 115-b, at 635, may multiplex the dropped transmission or a portion thereof with the other uplink transmission. In this example, at 640, the UE 115-b may determine to drop the first uplink transmission. Such a determination may be made in accordance with techniques discussed herein, such as based on a priority of the communication, a QOS, a type of data of the communication, and the like. At 645, the UE 115-b may multiplex a portion of the first uplink transmission with the second uplink transmission. Such multiplexing may include rate-matching or puncturing, such as discussed herein. The UE 115-b, at 650, may then transmit the second uplink transmission to the second TRP 105-d, which includes the multiplexed information from the first uplink transmission. In this example, at 655, the UE 115-b may also transmit a multiplexing indicator to the second TRP 105-d. The multiplexing indicator may be provided in the second uplink transmission, or in a subsequent transmission, in accordance with techniques discussed herein. At 660, the second TRP 105-d may identify the multiplexing indicator and demultiplex the received second uplink transmission. The first TRP 105-c and the second TRP 105-d may then, at 665, exchange data and the second TRP 105-d may provide the received information to the first TRP 105-c.

Figure 7:
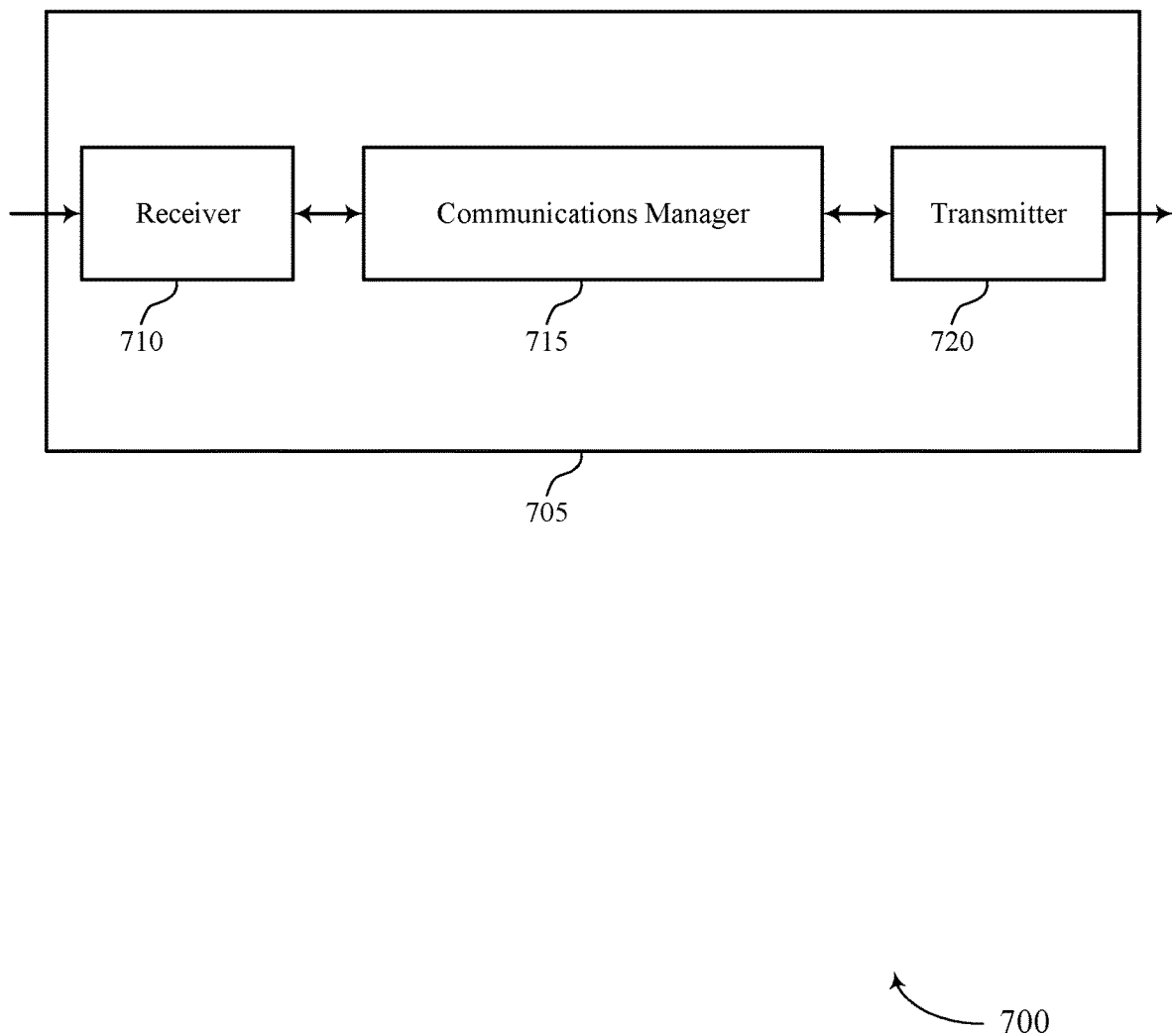
FIGS. 7 and 8 show block diagrams of devices that support techniques for concurrent uplink transmissions to multiple TRPs in accordance with aspects of the present disclosure.

FIG. 7 shows a block diagram 700 of a device 705 that supports techniques for concurrent uplink transmissions to multiple TRPs in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for concurrent uplink transmissions to multiple TRPs, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify that a combined transmission power for concurrent transmissions of a first communication to a first TRP and a second communication to a second TRP exceeds a power threshold of the UE, determine whether to reduce a transmission power of one or more of the first communication or the second communication, or to drop one of the first communication or the second communication, based on the combined transmission power exceeding the power threshold, and transmit one or more of the first communication or the second communication based on the determining. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
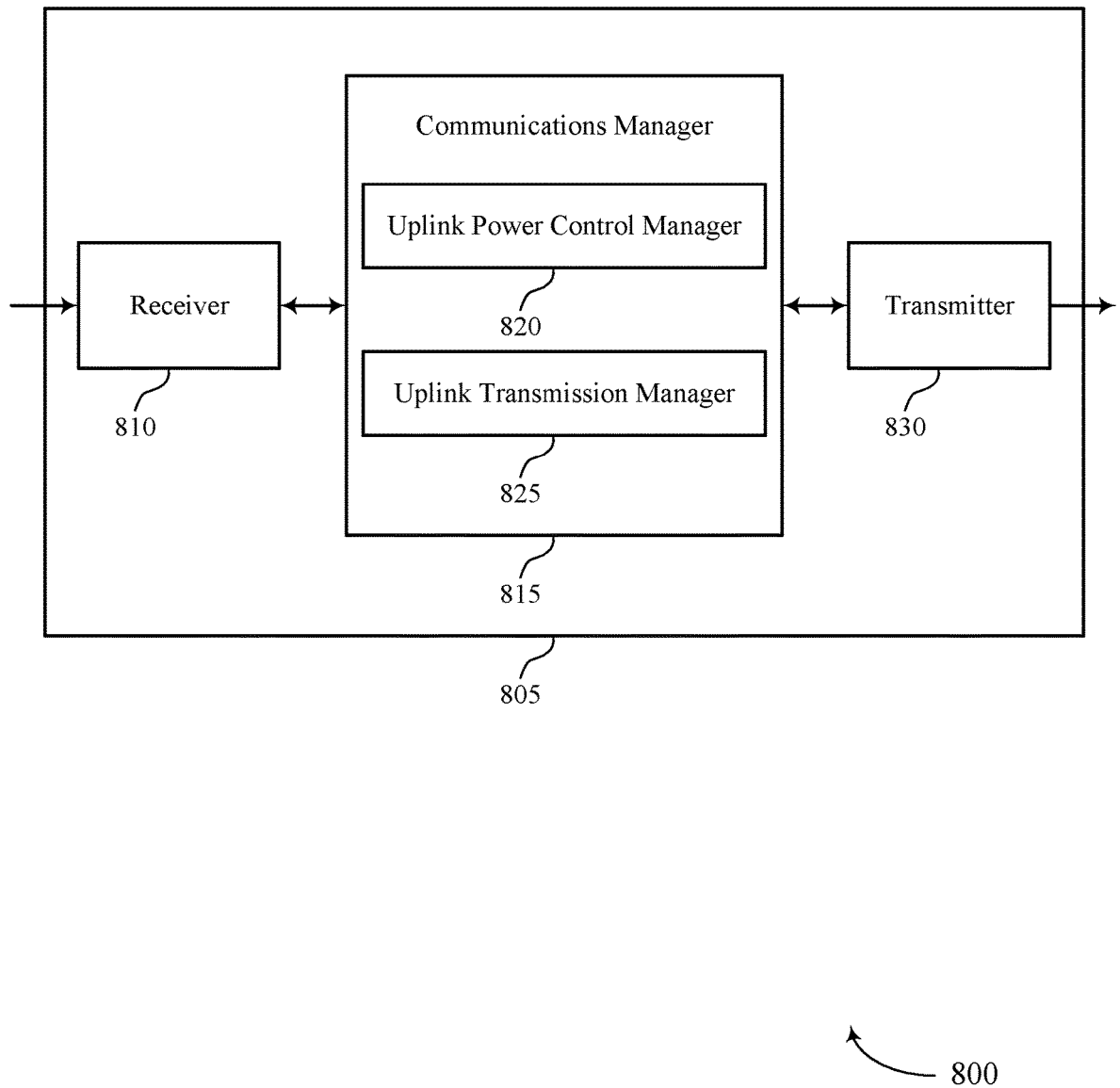

FIG. 8 shows a block diagram 800 of a device 805 that supports techniques for concurrent uplink transmissions to multiple TRPs in accordance with aspects of the present disclosure. The device 805 may be an example of aspects of a device 705, or a UE 115 as described herein. The device 805 may include a receiver 810, a communications manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, and information related to techniques for concurrent uplink transmissions to multiple TRPs, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an uplink power control manager 820 and an uplink transmission manager 825. The communications manager 815 may be an example of aspects of the communications manager 1010 described herein.

The uplink power control manager 820 may identify that a combined transmission power for concurrent transmissions of a first communication to a first TRP and a second communication to a second TRP exceeds a power threshold of the UE and determine whether to reduce a transmission power of one or more of the first communication or the second communication, or to drop one of the first communication or the second communication, based on the combined transmission power exceeding the power threshold.

The uplink transmission manager 825 may transmit one or more of the first communication or the second communication based on the determining.

The transmitter 830 may transmit signals generated by other components of the device 805. In some examples, the transmitter 830 may be collocated with a receiver 810 in a transceiver module. For example, the transmitter 830 may be an example of aspects of the transceiver 1020 described with reference to FIG. 10. The transmitter 830 may utilize a single antenna or a set of antennas.

Figure 9:
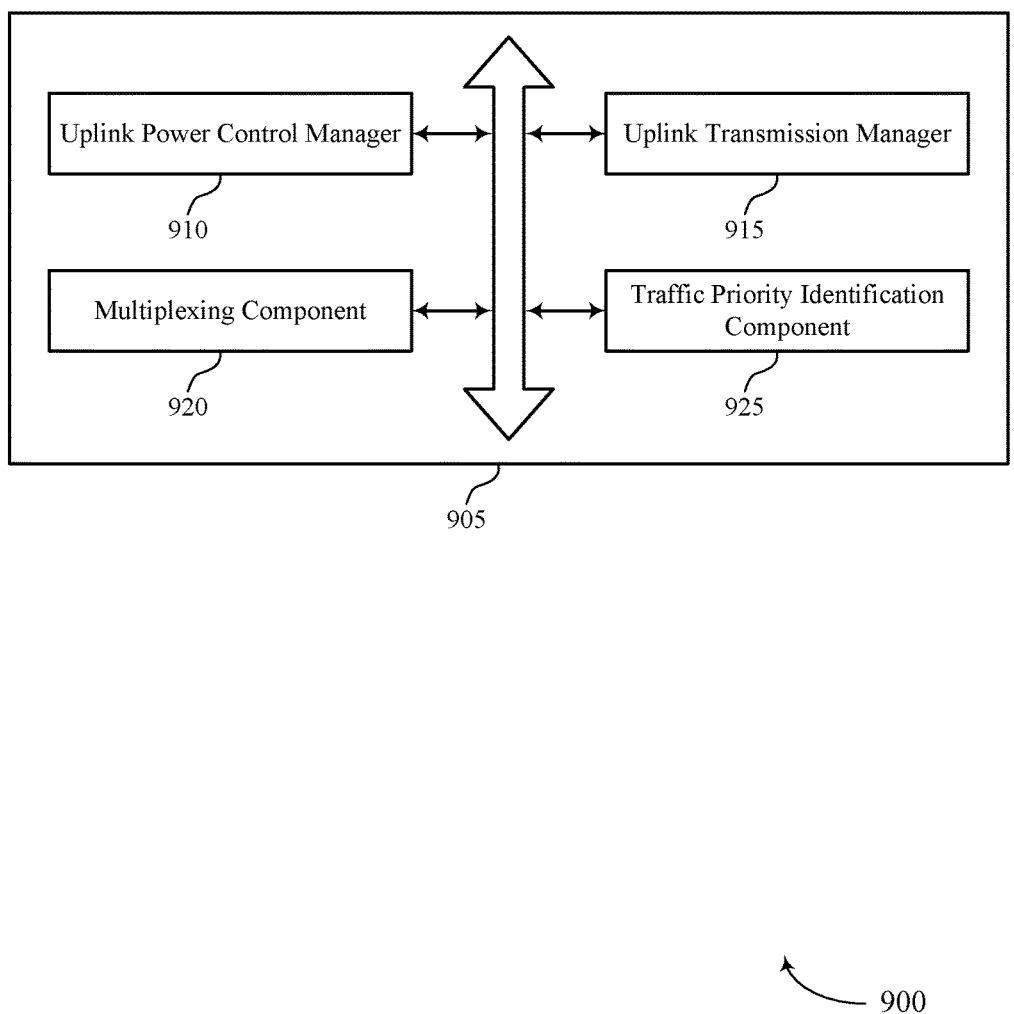
FIG. 9 shows a block diagram of a communications manager that supports techniques for concurrent uplink transmissions to multiple TRPs in accordance with aspects of the present disclosure.

FIG. 9 shows a block diagram 900 of a communications manager 905 that supports techniques for concurrent uplink transmissions to multiple TRPs in accordance with aspects of the present disclosure. The communications manager 905 may be an example of aspects of a communications manager 715, a communications manager 815, or a communications manager 1010 described herein. The communications manager 905 may include an uplink power control manager 910, an uplink transmission manager 915, a multiplexing component 920, and a traffic priority identification component 925. Each of these modules may communicate, directly or indirectly, with one another (e.g., via one or more buses).

The uplink power control manager 910 may identify that a combined transmission power for concurrent transmissions of a first communication to a first TRP and a second communication to a second TRP exceeds a power threshold of the UE. In some examples, the uplink power control manager 910 may determine whether to reduce a transmission power of one or more of the first communication or the second communication, or to drop one of the first communication or the second communication, based on the combined transmission power exceeding the power threshold. In some examples, the uplink power control manager 910 may determine to reduce the transmission power of one or more of the first communication or the second communication when a difference between the first adjusted transmission power and the second adjusted transmission power is less than or equal to a power difference threshold.

In some examples, the uplink power control manager 910 may determine a first power reduction factor for the first communication based on the first traffic priority and a second power reduction factor for the second communication based on the second traffic priority. In some examples, the uplink power control manager 910 may apply the first power reduction factor to a first initial transmission power of the first communication to obtain a first adjusted transmission power and the second power reduction factor to a second initial transmission power of the second communication to obtain a second adjusted transmission power.

The uplink transmission manager 915 may transmit one or more of the first communication or the second communication based on the determining.

The multiplexing component 920 may determine to drop one of the first communication or the second communication when the difference between the first adjusted transmission power and the second adjusted transmission power exceeds the power difference threshold. In some examples, the multiplexing component 920 may multiplex at least a portion of information to be transmitted in the first communication into the second communication.

In some examples, the multiplexing component 920 may rate-match first uplink control information of the first communication around second uplink control information of the second communication, and rate-match uplink data of the second communication around the first uplink control information and the second uplink control information. In some examples, the multiplexing component 920 may puncture a portion of the second communication with first uplink control information of the first communication.

In some examples, the multiplexing component 920 may transmit an indication to the second TRP that indicates that the portion of information to be transmitted in the first communication is multiplexed into the second communication, and where the indication further indicates rate-matching or puncturing of the second communication. In some cases, the first communication has a lower traffic priority than the second communication, and where the portion of information to be transmitted in the first communication includes control information associated with the first communication. In some cases, the first communication is an eMBB communication and the second communication is a URLLC communication, and where a URLLC codebook accommodates transmission of eMBB control information with a URLLC communication. In some cases, the indication to the second TRP indicates one or more of a payload size, a length, a resource element location, or any combinations thereof, of the portion of information to be transmitted in the first communication is multiplexed into the second communication. In some cases, the indication to the second TRP is transmitted in a subsequent uplink communication with the second TRP that is transmitted after the second communication. In some cases, the indication to the second TRP is transmitted in a MAC-CE or in an uplink control information transmission to the second TRP.

The traffic priority identification component 925 may identify a first traffic priority of the first communication and a second traffic priority of the second communication. In some cases, the first traffic priority and the second traffic priority are identified based on one or more of a CORESET identification associated with the first communication and the second communication, a RRC configuration, a type of data to be transmitted in the first communication and the second communication, or any combinations thereof.

Figure 10:
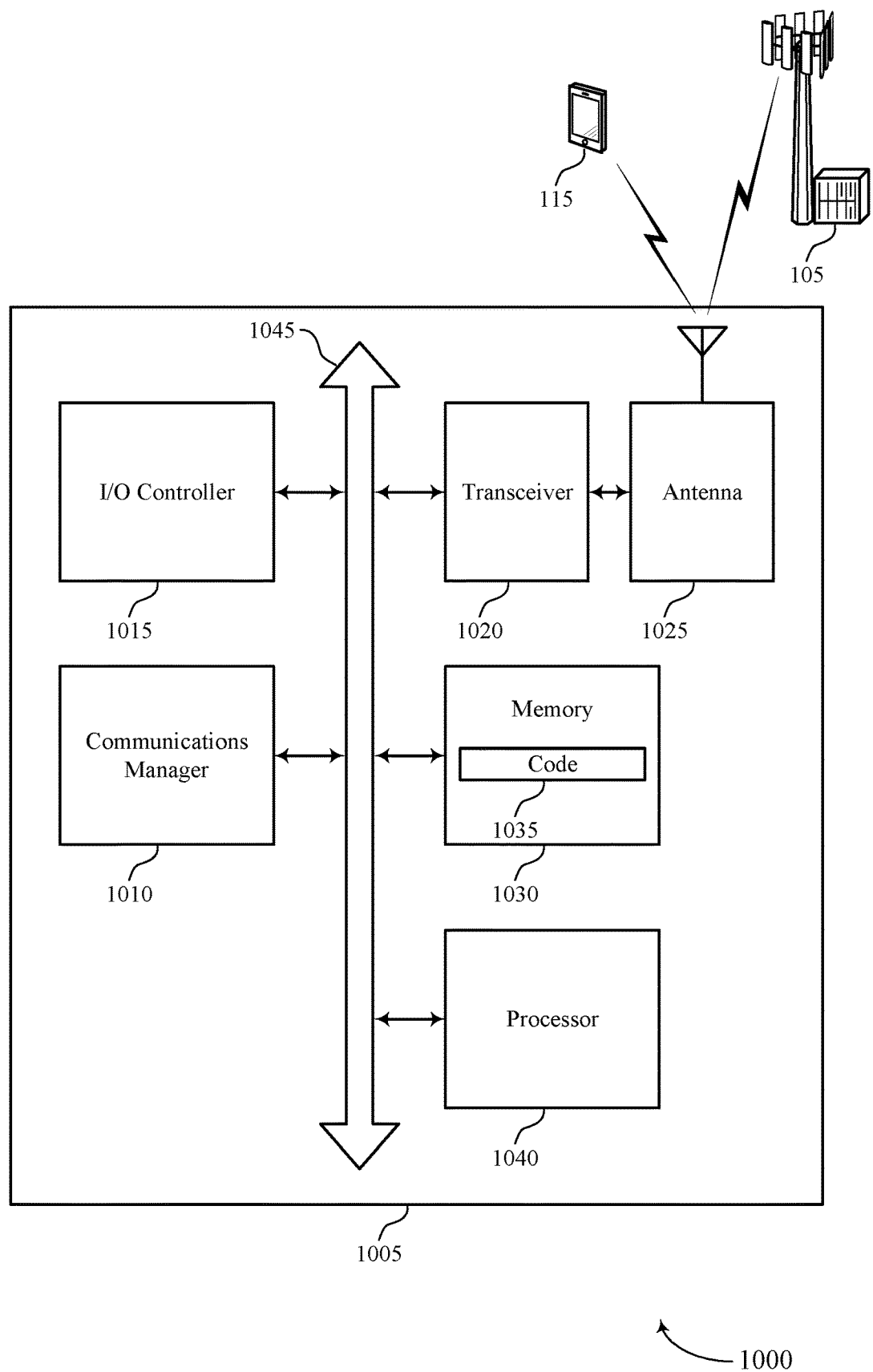
FIG. 10 shows a diagram of a system including a device that supports techniques for concurrent uplink transmissions to multiple TRPs in accordance with aspects of the present disclosure.

FIG. 10 shows a diagram of a system 1000 including a device 1005 that supports techniques for concurrent uplink transmissions to multiple TRPs in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify that a combined transmission power for concurrent transmissions of a first communication to a first TRP and a second communication to a second TRP exceeds a power threshold of the UE, determine whether to reduce a transmission power of one or more of the first communication or the second communication, or to drop one of the first communication or the second communication, based on the combined transmission power exceeding the power threshold, and transmit one or more of the first communication or the second communication based on the determining.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for concurrent uplink transmissions to multiple TRPs).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
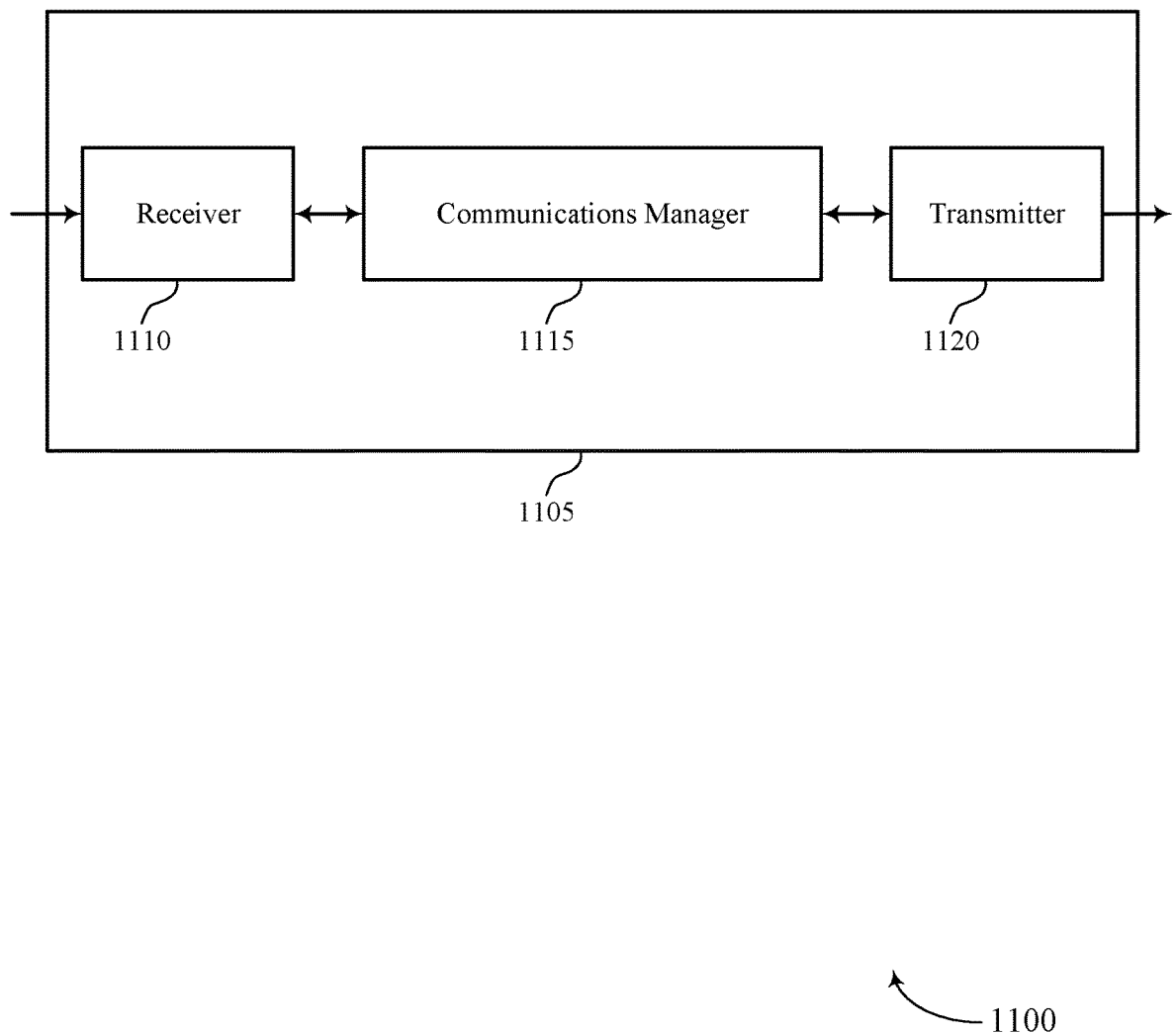
FIGS. 11 and 12 show block diagrams of devices that support techniques for concurrent uplink transmissions to multiple TRPs in accordance with aspects of the present disclosure.

FIG. 11 shows a block diagram 1100 of a device 1105 that supports techniques for concurrent uplink transmissions to multiple TRPs in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for concurrent uplink transmissions to multiple TRPs, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may establish a connection with a UE that is configured for concurrent uplink transmissions with the first TRP and a second TRP, receive a first uplink communication from the UE, determine, based on an indication provided by the UE, that the first uplink communication includes multiplexed data from a second uplink communication associated with the second TRP, and provide the multiplexed data to the second TRP. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
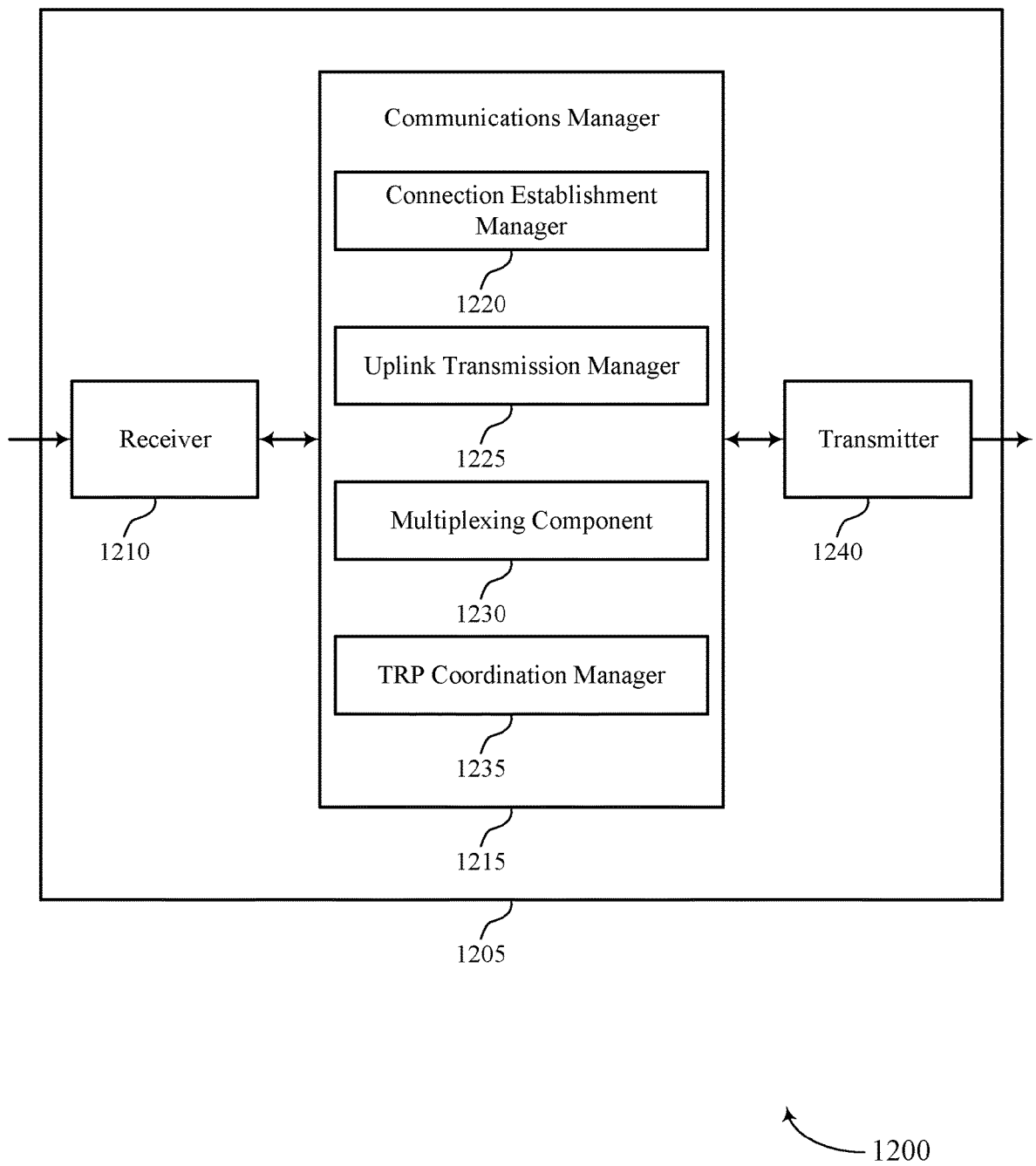

FIG. 12 shows a block diagram 1200 of a device 1205 that supports techniques for concurrent uplink transmissions to multiple TRPs in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for concurrent uplink transmissions to multiple TRPs, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a connection establishment manager 1220, an uplink transmission manager 1225, a multiplexing component 1230, and a TRP coordination manager 1235. The communications manager 1215 may be an example of aspects of the communications manager 1410 described herein.

The connection establishment manager 1220 may establish a connection with a UE that is configured for concurrent uplink transmissions with the first TRP and a second TRP.

The uplink transmission manager 1225 may receive a first uplink communication from the UE.

The multiplexing component 1230 may determine, based on an indication provided by the UE, that the first uplink communication includes multiplexed data from a second uplink communication associated with the second TRP.

The TRP coordination manager 1235 may provide the multiplexed data to the second TRP.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
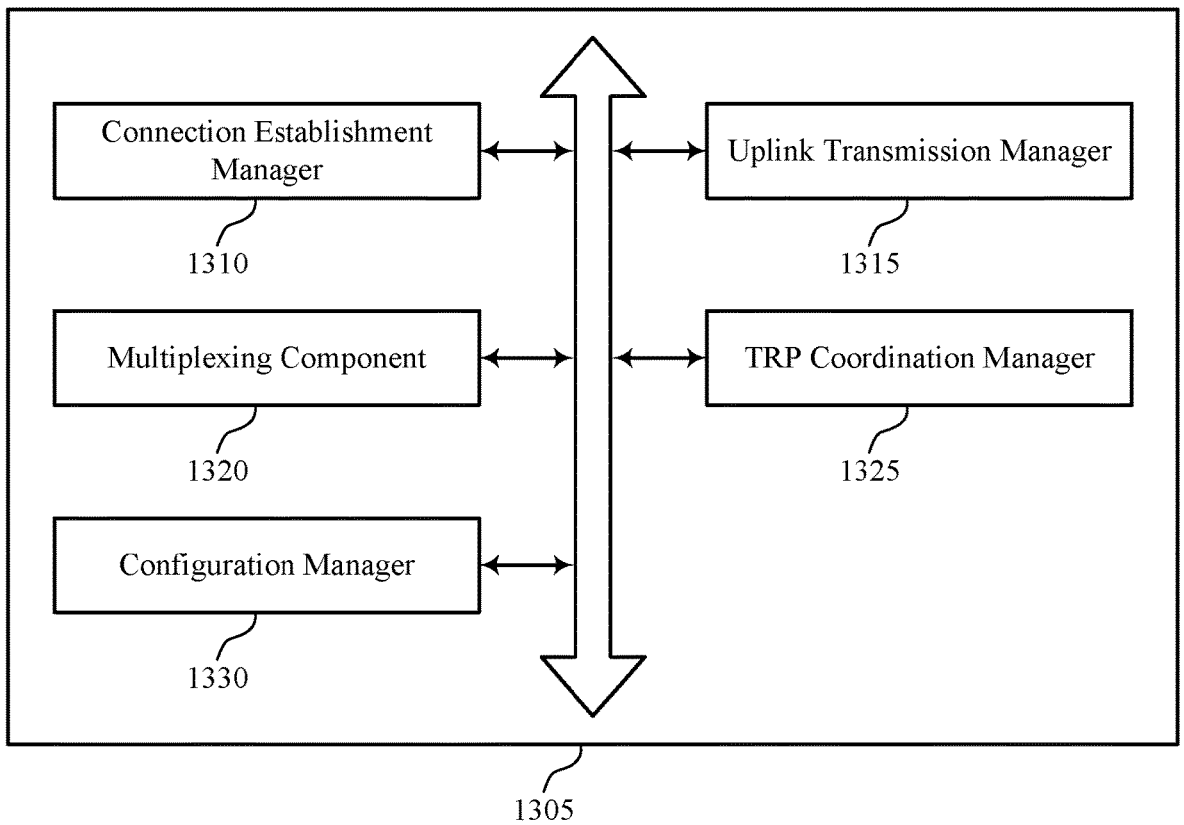
FIG. 13 shows a block diagram of a communications manager that supports techniques for concurrent uplink transmissions to multiple TRPs in accordance with aspects of the present disclosure.

FIG. 13 shows a block diagram 1300 of a communications manager 1305 that supports techniques for concurrent uplink transmissions to multiple TRPs in accordance with aspects of the present disclosure. The communications manager 1305 may be an example of aspects of a communications manager 1115, a communications manager 1215, or a communications manager 1410 described herein. The communications manager 1305 may include a connection establishment manager 1310, an uplink transmission manager 1315, a multiplexing component 1320, a TRP coordination manager 1325, and a configuration manager 1330. Each of these modules may communicate, directly or indirectly, with one another (e.g., via one or more buses).

The connection establishment manager 1310 may establish a connection with a UE that is configured for concurrent uplink transmissions with the first TRP and a second TRP.

The uplink transmission manager 1315 may receive a first uplink communication from the UE. In some cases, the second uplink communication is an eMBB communication and the first uplink communication is a URLLC communication, and where a URLLC codebook accommodates transmission of eMBB control information with a URLLC communication.

The multiplexing component 1320 may determine, based on an indication provided by the UE, that the first uplink communication includes multiplexed data from a second uplink communication associated with the second TRP. In some examples, second uplink control information of the second uplink communication that is rate-matched around first uplink control information of the first uplink communication, and uplink data of the first uplink communication that is rate-matched around the first uplink control information and the second uplink control information. In some cases, a portion of the first communication is punctured with second uplink control information of the second uplink communication. In some examples, the multiplexing component 1320 may receive the indication from the UE that indicates that the first uplink communication includes the multiplexed data, and where the indication further indicates rate-matching or puncturing of the first uplink communication.

In some cases, the second uplink communication has a lower traffic priority than the first uplink communication, and the multiplexed data from the second uplink communication includes control information associated with the second uplink communication. In some cases, the indication from the UE indicates one or more of a payload size, a length, a resource element location, or any combinations thereof, of the multiplexed data. In some cases, the indication from the UE is transmitted in a subsequent uplink communication to the first TRP that is transmitted after the first uplink communication. In some cases, the indication is transmitted in a MAC-CE or in an uplink control information transmission.

The TRP coordination manager 1325 may provide the multiplexed data to the second TRP. The configuration manager 1330 may configure the UE to transmit the multiplexed data in the first uplink communication according to a first traffic priority of the first uplink communication and a second traffic priority of the second uplink communication. In some cases, the configuration manager 1330 may configure the UE to reduce a transmission power of one or more of the first uplink communication or the second uplink communication based on a transmission power threshold or to drop one or the first uplink communication or the second uplink communication based on a difference in transmission powers of the first uplink communication and the second uplink communication exceeding a power difference threshold. In some cases, the first traffic priority and the second traffic priority are identified based on one or more of a CORESET identification associated with the first communication and the second communication, a RRC configuration, a type of data to be transmitted in the first communication and the second communication, or any combinations thereof.

Figure 14:
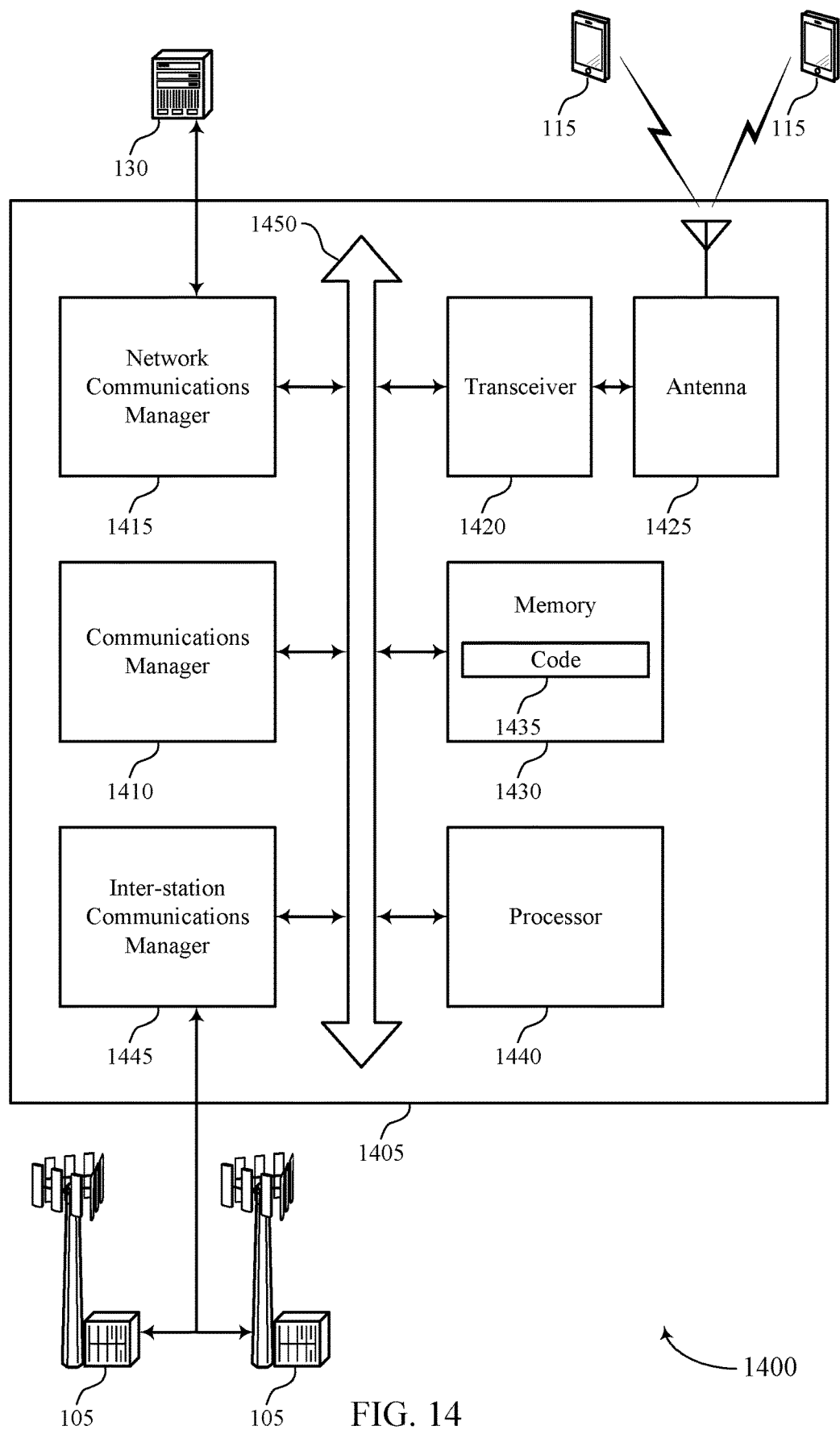
FIG. 14 shows a diagram of a system including a device that supports techniques for concurrent uplink transmissions to multiple TRPs in accordance with aspects of the present disclosure.

FIG. 14 shows a diagram of a system 1400 including a device 1405 that supports techniques for concurrent uplink transmissions to multiple TRPs in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may establish a connection with a UE that is configured for concurrent uplink transmissions with the first TRP and a second TRP, receive a first uplink communication from the UE, determine, based on an indication provided by the UE, that the first uplink communication includes multiplexed data from a second uplink communication associated with the second TRP, and provide the multiplexed data to the second TRP.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for concurrent uplink transmissions to multiple TRPs).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
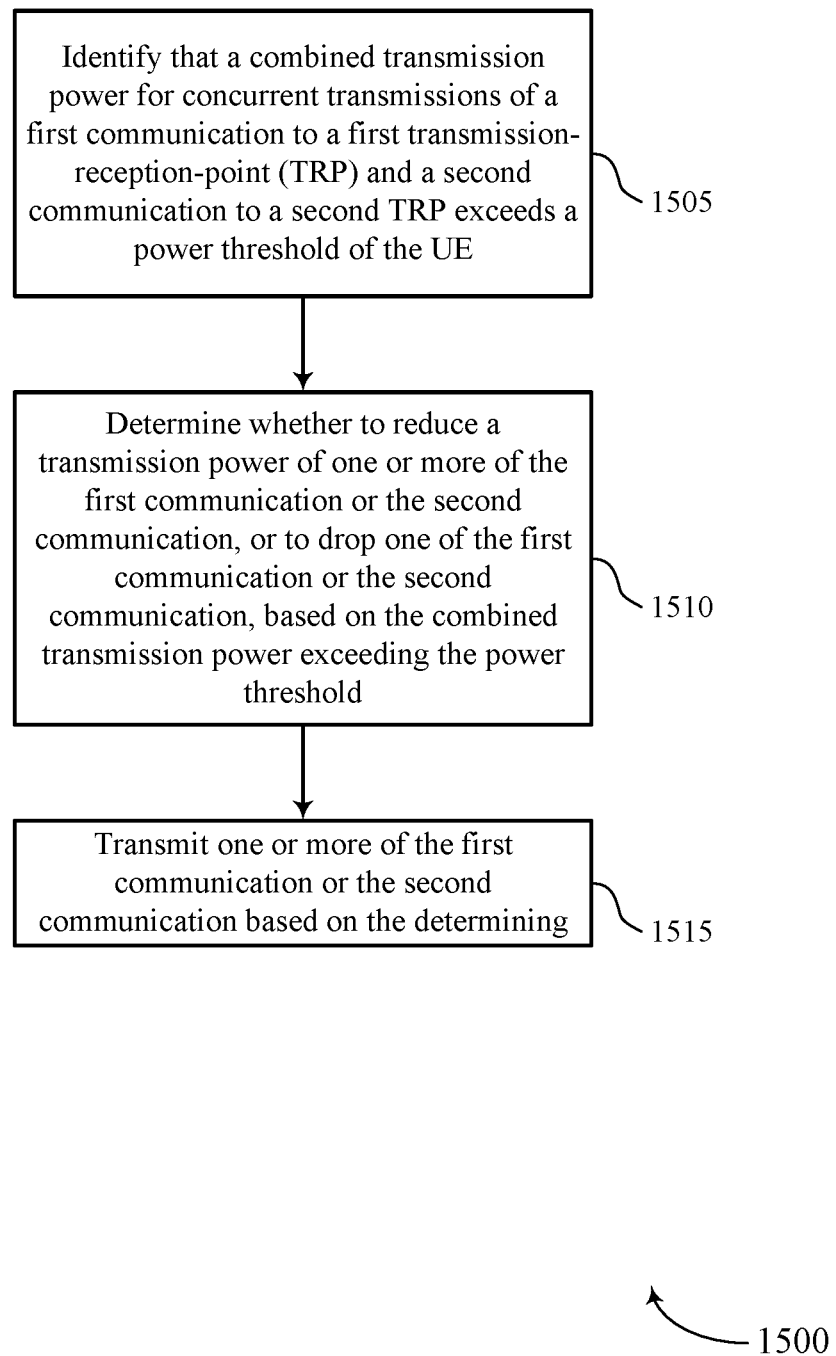
FIGS. 15 through 21 show flowcharts illustrating methods that support techniques for concurrent uplink transmissions to multiple TRPs in accordance with aspects of the present disclosure.

FIG. 15 shows a flowchart illustrating a method 1500 that supports techniques for concurrent uplink transmissions to multiple TRPs in accordance with aspects of the present disclosure. The operations of method 1500 may be implemented by a UE 115 or its components as described herein.

For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may identify that a combined transmission power for concurrent transmissions of a first communication to a first TRP and a second communication to a second TRP exceeds a power threshold of the UE. The operations of 1505 may be performed according to the methods described herein. In some examples, aspects of the operations of 1505 may be performed by an uplink power control manager as described with reference to FIGS. 7 through 10.

At 1510, the UE may determine whether to reduce a transmission power of one or more of the first communication or the second communication, or to drop one of the first communication or the second communication, based on the combined transmission power exceeding the power threshold. The operations of 1510 may be performed according to the methods described herein. In some examples, aspects of the operations of 1510 may be performed by an uplink power control manager as described with reference to FIGS. 7 through 10.

At 1515, the UE may transmit one or more of the first communication or the second communication based on the determining. The operations of 1515 may be performed according to the methods described herein. In some examples, aspects of the operations of 1515 may be performed by an uplink transmission manager as described with reference to FIGS. 7 through 10.

Figure 16:
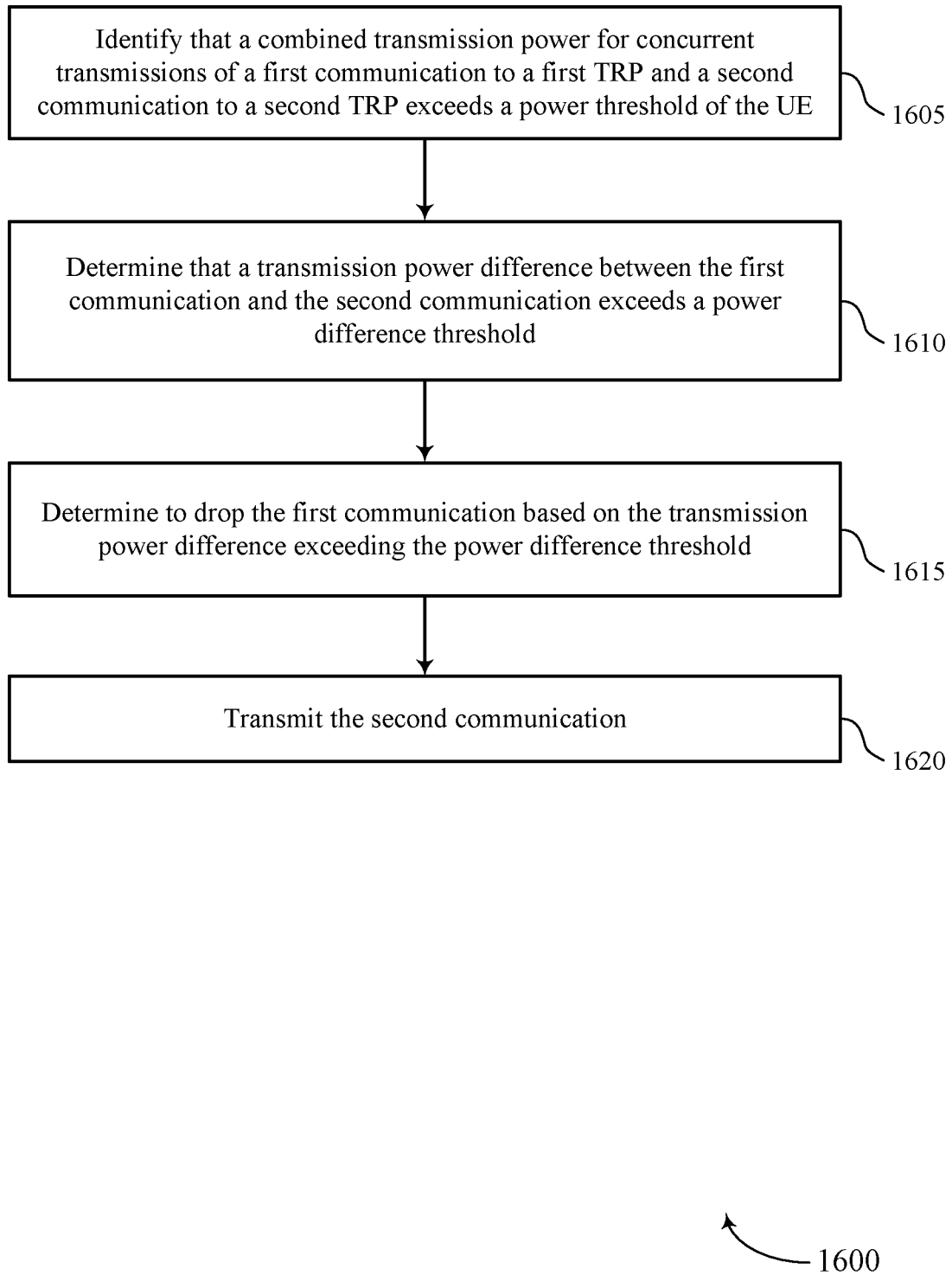

FIG. 16 shows a flowchart illustrating a method 1600 that supports techniques for concurrent uplink transmissions to multiple TRPs in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may identify that a combined transmission power for concurrent transmissions of a first communication to a first TRP and a second communication to a second TRP exceeds a power threshold of the UE. The operations of 1605 may be performed according to the methods described herein. In some examples, aspects of the operations of 1605 may be performed by an uplink power control manager as described with reference to FIGS. 7 through 10.

At 1610, the UE may determine that a transmission power difference between the first communication and the second communication exceeds a power difference threshold. The operations of 1610 may be performed according to the methods described herein. In some examples, aspects of the operations of 1610 may be performed by a multiplexing component as described with reference to FIGS. 7 through 10.

At 1615, the UE may determine to drop the first communication based on the transmission power difference exceeding the power difference threshold. The operations of 1615 may be performed according to the methods described herein. In some examples, aspects of the operations of 1615 may be performed by an uplink power control manager as described with reference to FIGS. 7 through 10.

At 1620, the UE may transmit the second communication based on the determining. The operations of 1620 may be performed according to the methods described herein. In some examples, aspects of the operations of 1620 may be performed by an uplink transmission manager as described with reference to FIGS. 7 through 10.

Figure 17:
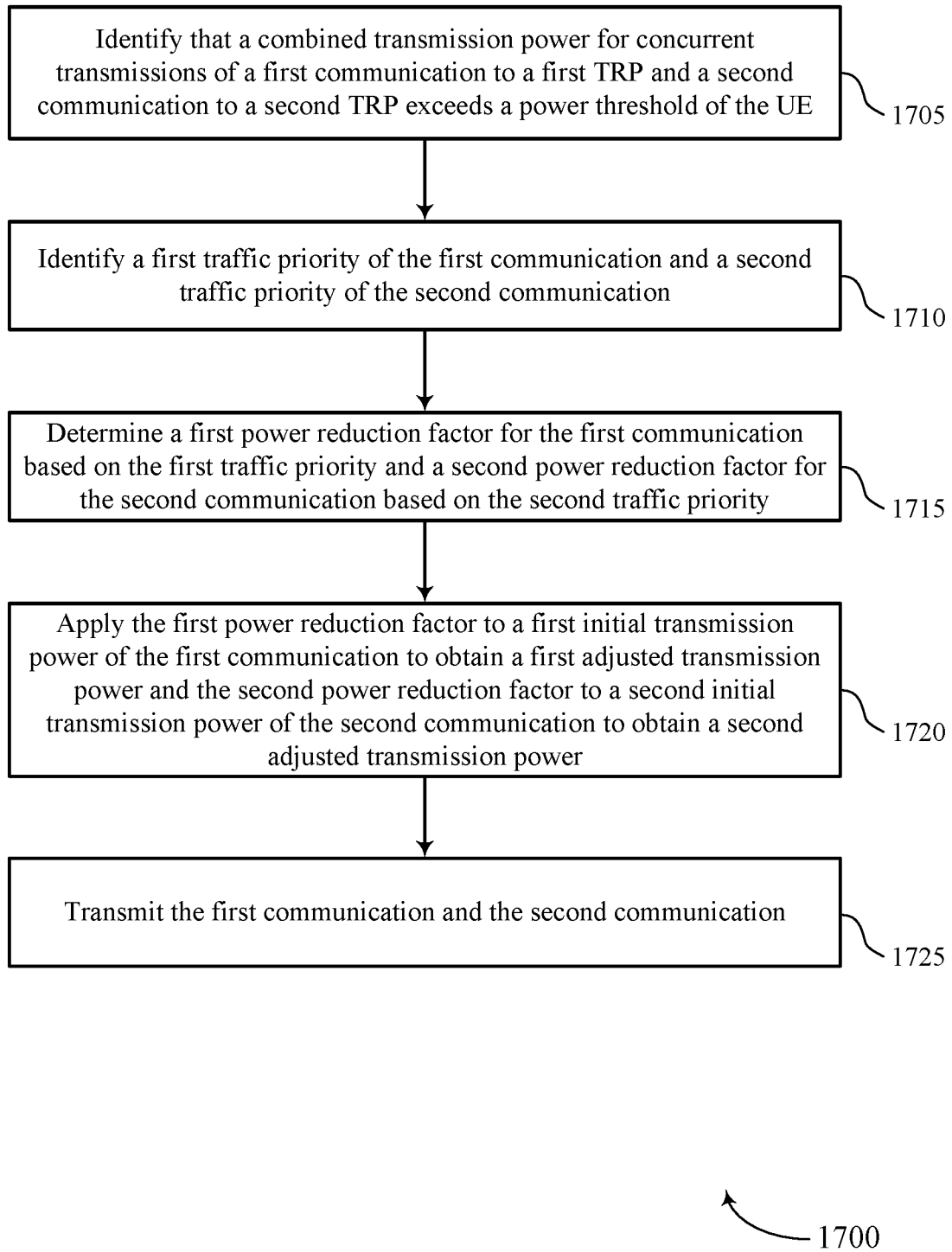

FIG. 17 shows a flowchart illustrating a method 1700 that supports techniques for concurrent uplink transmissions to multiple TRPs in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may identify that a combined transmission power for concurrent transmissions of a first communication to a first TRP and a second communication to a second TRP exceeds a power threshold of the UE. The operations of 1705 may be performed according to the methods described herein. In some examples, aspects of the operations of 1705 may be performed by an uplink power control manager as described with reference to FIGS. 7 through 10.

At 1710, the UE may identify a first traffic priority of the first communication and a second traffic priority of the second communication. The operations of 1710 may be performed according to the methods described herein. In some examples, aspects of the operations of 1710 may be performed by a traffic priority identification component as described with reference to FIGS. 7 through 10.

At 1715, the UE may determine a first power reduction factor for the first communication based on the first traffic priority and a second power reduction factor for the second communication based on the second traffic priority. The operations of 1715 may be performed according to the methods described herein. In some examples, aspects of the operations of 1715 may be performed by an uplink power control manager as described with reference to FIGS. 7 through 10.

At 1720, the UE may apply the first power reduction factor to a first initial transmission power of the first communication to obtain a first adjusted transmission power and the second power reduction factor to a second initial transmission power of the second communication to obtain a second adjusted transmission power. The operations of 1720 may be performed according to the methods described herein. In some examples, aspects of the operations of 1720 may be performed by an uplink power control manager as described with reference to FIGS. 7 through 10. In some cases, the first traffic priority and the second traffic priority are identified based on one or more of a CORESET identification associated with the first communication and the second communication, a RRC configuration, a type of data to be transmitted in the first communication and the second communication, or any combinations thereof.

At 1725, the UE may transmit the first communication and the second communication based on the determining. The operations of 1725 may be performed according to the methods described herein. In some examples, aspects of the operations of 1725 may be performed by an uplink transmission manager as described with reference to FIGS. 7 through 10.

Figure 18:
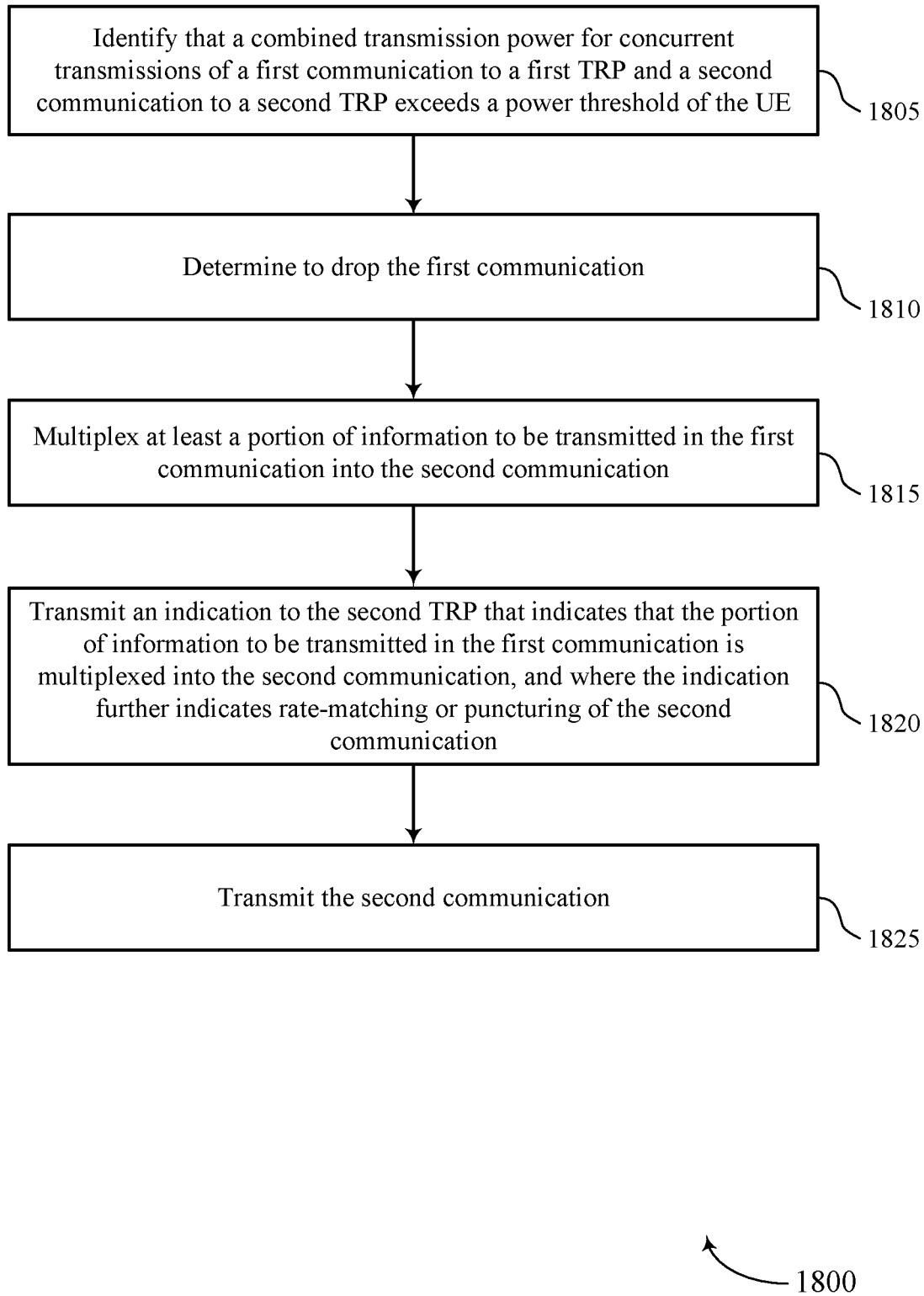

FIG. 18 shows a flowchart illustrating a method 1800 that supports techniques for concurrent uplink transmissions to multiple TRPs in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may identify that a combined transmission power for concurrent transmissions of a first communication to a first TRP and a second communication to a second TRP exceeds a power threshold of the UE. The operations of 1805 may be performed according to the methods described herein. In some examples, aspects of the operations of 1805 may be performed by an uplink power control manager as described with reference to FIGS. 7 through 10.

At 1810, the UE may determine to drop the first communication, based on the combined transmission power exceeding the power threshold, a channel priority, data type, or any combinations thereof of the first communication and the second communication. The operations of 1810 may be performed according to the methods described herein. In some examples, aspects of the operations of 1810 may be performed by a multiplexing component as described with reference to FIGS. 7 through 10.

At 1815, the UE may multiplex at least a portion of information to be transmitted in the first communication into the second communication. The operations of 1815 may be performed according to the methods described herein. In some examples, aspects of the operations of 1815 may be performed by a multiplexing component as described with reference to FIGS. 7 through 10. In some cases, the first communication has a lower traffic priority than the second communication, and where the portion of information to be transmitted in the first communication includes control information associated with the first communication. For example, the first communication may be an eMBB communication and the second communication may be a URLLC communication, and a URLLC codebook accommodates transmission of eMBB control information with a URLLC communication.

In some cases, the UE may rate-match first uplink control information of the first communication around second uplink control information of the second communication, and rate-match uplink data of the second communication around the first uplink control information and the second uplink control information. In other cases, the UE may puncture a portion of the second communication with first uplink control information of the first communication.

At 1820, the UE may transmit an indication to the second TRP that indicates that the portion of information to be transmitted in the first communication is multiplexed into the second communication, and where the indication further indicates rate-matching or puncturing of the second communication. The operations of 1820 may be performed according to the methods described herein. In some examples, aspects of the operations of 1820 may be performed by a multiplexing component as described with reference to FIGS. 7 through 10. In some cases, the indication to the second TRP indicates one or more of a payload size, a length, a resource element location, or any combinations thereof, of the portion of information to be transmitted in the first communication is multiplexed into the second communication. In some cases, the indication to the second TRP is transmitted in a subsequent uplink communication with the second TRP that is transmitted after the second communication. In some cases, the indication to the second TRP is transmitted in a MAC-CE or in an uplink control information transmission to the second TRP.

At 1825, the UE may transmit the second communication based on the determining. The operations of 1825 may be performed according to the methods described herein. In some examples, aspects of the operations of 1825 may be performed by an uplink transmission manager as described with reference to FIGS. 7 through 10.

Figure 19:
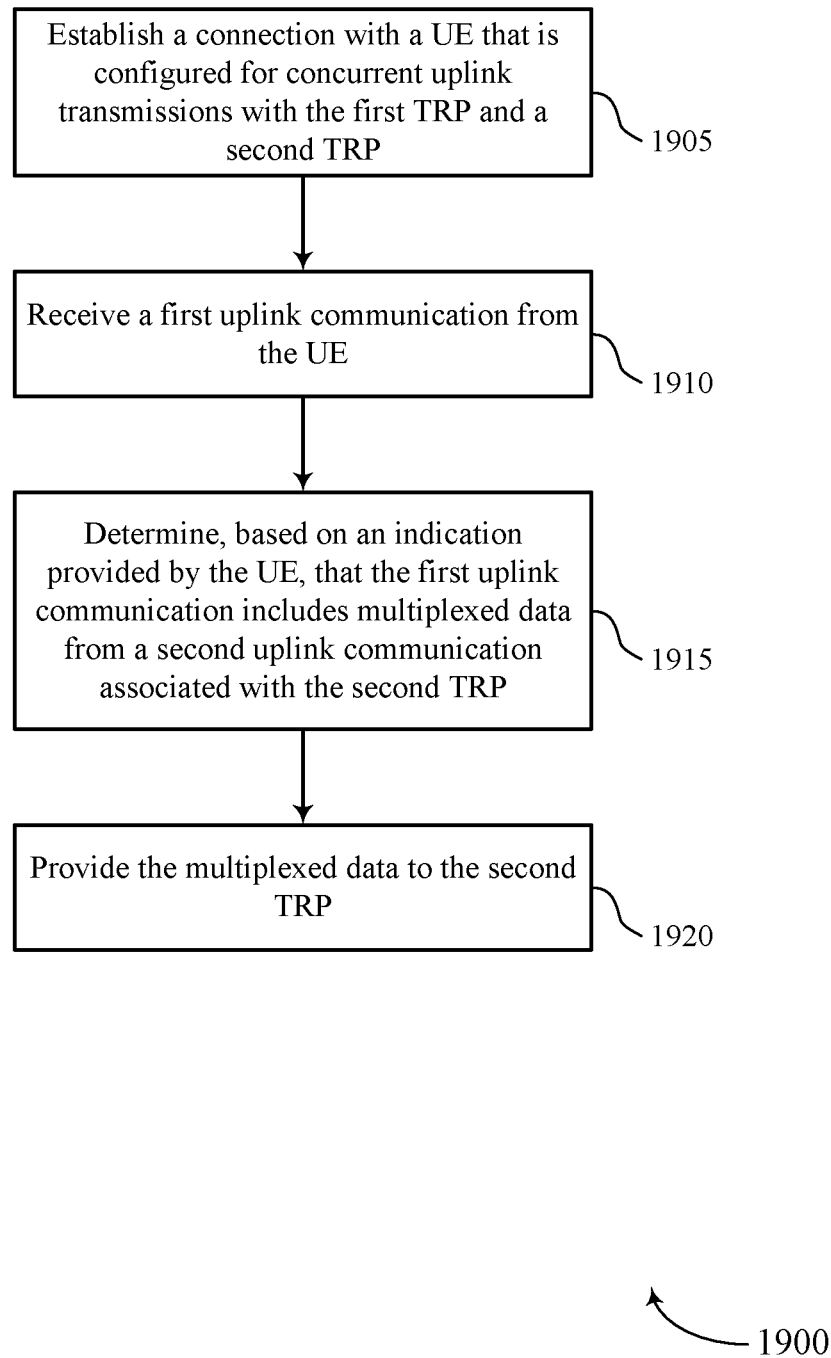

FIG. 19 shows a flowchart illustrating a method 1900 that supports techniques for concurrent uplink transmissions to multiple TRPs in accordance with aspects of the present disclosure. The operations of method 1900 may be implemented by a base station 105 or TRP, or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, a first TRP may establish a connection with a UE that is configured for concurrent uplink transmissions with the first TRP and a second TRP. The operations of 1905 may be performed according to the methods described herein. In some examples, aspects of the operations of 1905 may be performed by a connection establishment manager as described with reference to FIGS. 11 through 14.

At 1910, the first TRP may receive a first uplink communication from the UE. The operations of 1910 may be performed according to the methods described herein. In some examples, aspects of the operations of 1910 may be performed by an uplink transmission manager as described with reference to FIGS. 11 through 14.

At 1915, the first TRP may determine, based on an indication provided by the UE, that the first uplink communication includes multiplexed data from a second uplink communication associated with the second TRP. The operations of 1915 may be performed according to the methods described herein. In some examples, aspects of the operations of 1915 may be performed by a multiplexing component as described with reference to FIGS. 11 through 14.

At 1920, the first TRP may provide the multiplexed data to the second TRP (e.g., via a backhaul link). The operations of 1920 may be performed according to the methods described herein. In some examples, aspects of the operations of 1920 may be performed by a TRP coordination manager as described with reference to FIGS. 11 through 14.

Figure 20:
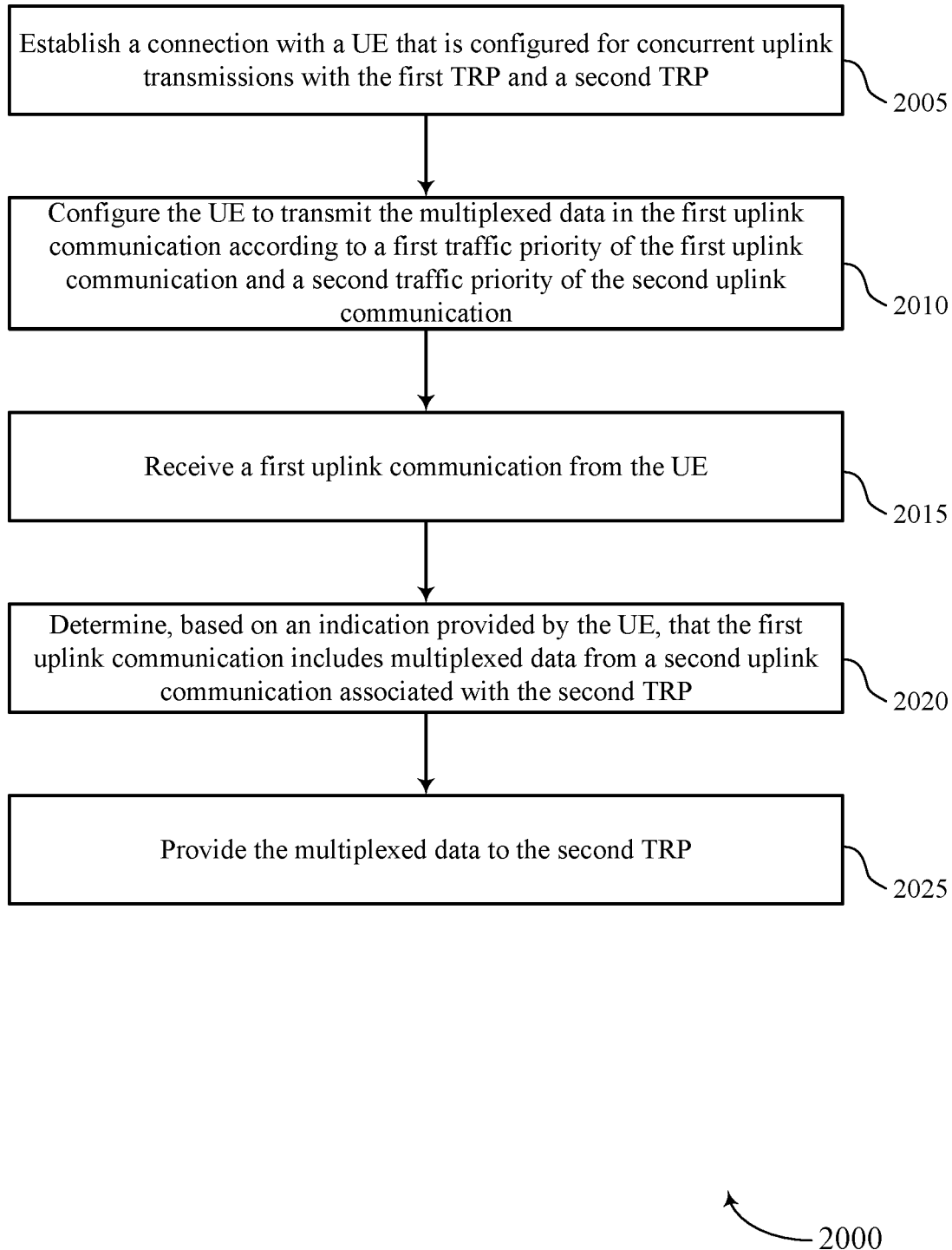

FIG. 20 shows a flowchart illustrating a method 2000 that supports techniques for concurrent uplink transmissions to multiple TRPs in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, a first TRP may establish a connection with a UE that is configured for concurrent uplink transmissions with the first TRP and a second TRP. The operations of 2005 may be performed according to the methods described herein. In some examples, aspects of the operations of 2005 may be performed by a connection establishment manager as described with reference to FIGS. 11 through 14.

At 2010, the first TRP may configure the UE to transmit multiplexed data in the first uplink communication according to a first traffic priority of the first uplink communication and a second traffic priority of the second uplink communication. The operations of 2010 may be performed according to the methods described herein. In some examples, aspects of the operations of 2010 may be performed by a configuration manager as described with reference to FIGS. 11 through 14. In some cases, the first TRP may configure the UE to drop one or the first uplink communication or the second uplink communication based on a difference in transmission powers of the first uplink communication and the second uplink communication exceeding a power difference threshold. In some cases, the first traffic priority and the second traffic priority are identified based on one or more of a CORESET identification associated with the first communication and the second communication, a RRC configuration, a type of data to be transmitted in the first communication and the second communication, or any combinations thereof. In some cases, the second uplink communication has a lower traffic priority than the first uplink communication, and the multiplexed data from the second uplink communication includes control information associated with the second uplink communication.

At 2015, the first TRP may receive a first uplink communication from the UE. The operations of 2015 may be performed according to the methods described herein. In some examples, aspects of the operations of 2015 may be performed by an uplink transmission manager as described with reference to FIGS. 11 through 14.

At 2020, the first TRP may determine, based on an indication provided by the UE, that the first uplink communication includes multiplexed data from a second uplink communication associated with the second TRP. The operations of 2020 may be performed according to the methods described herein. In some examples, aspects of the operations of 2020 may be performed by a multiplexing component as described with reference to FIGS. 11 through 14.

At 2025, the first TRP may provide the multiplexed data to the second TRP. The operations of 2025 may be performed according to the methods described herein. In some examples, aspects of the operations of 2025 may be performed by a TRP coordination manager as described with reference to FIGS. 11 through 14.

Figure 21:
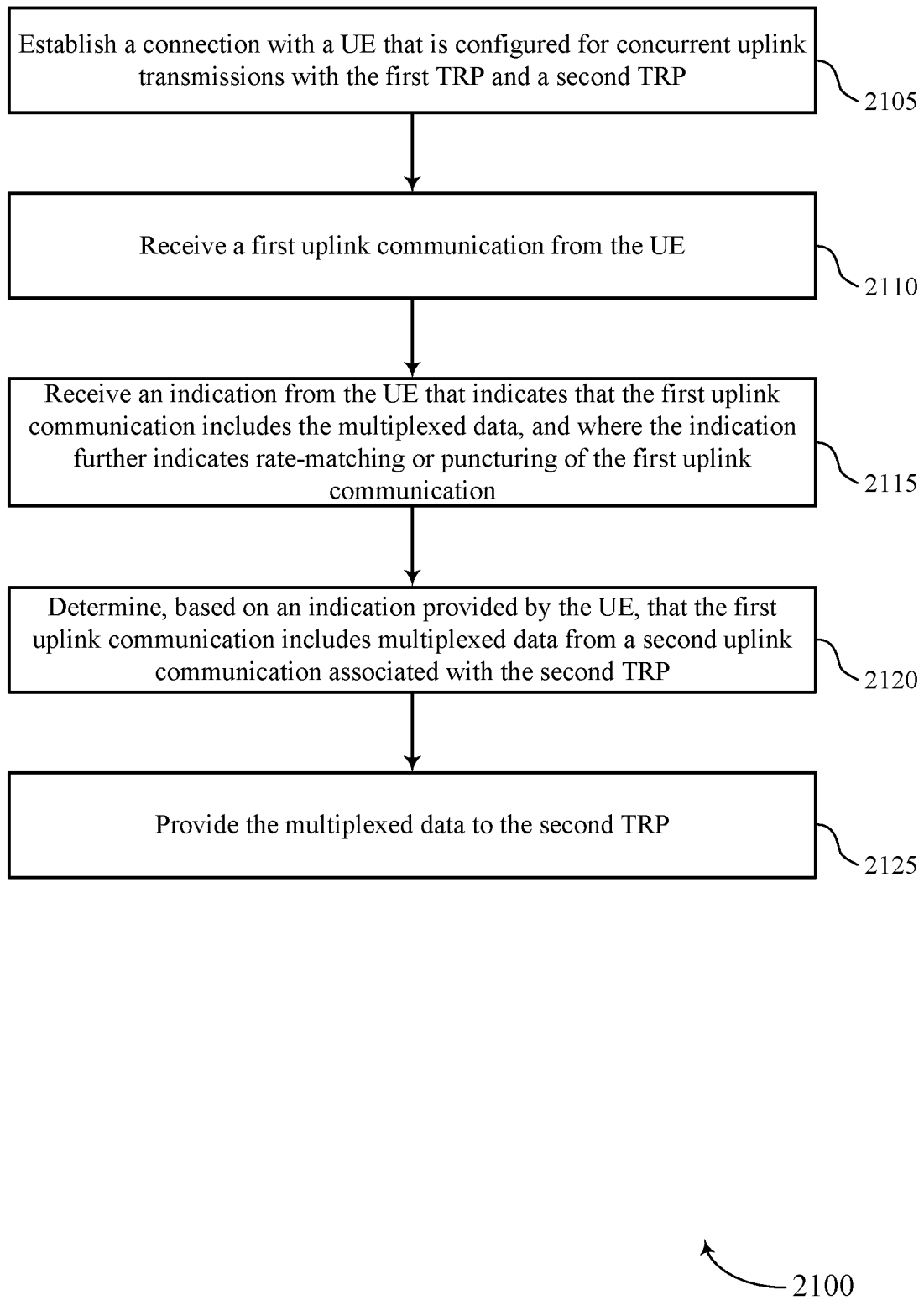

FIG. 21 shows a flowchart illustrating a method 2100 that supports techniques for concurrent uplink transmissions to multiple TRPs in accordance with aspects of the present disclosure. The operations of method 2100 may be implemented by a base station 105 or TRP, or its components as described herein. For example, the operations of method 2100 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the first TRP may establish a connection with a UE that is configured for concurrent uplink transmissions with the first TRP and a second TRP. The operations of 2105 may be performed according to the methods described herein. In some examples, aspects of the operations of 2105 may be performed by a connection establishment manager as described with reference to FIGS. 11 through 14.

At 2110, the first TRP may receive a first uplink communication from the UE. The operations of 2110 may be performed according to the methods described herein. In some examples, aspects of the operations of 2110 may be performed by an uplink transmission manager as described with reference to FIGS. 11 through 14.

At 2115, the first TRP may receive an indication from the UE that indicates that the first uplink communication includes the multiplexed data, and where the indication further indicates rate-matching or puncturing of the first uplink communication. The operations of 2115 may be performed according to the methods described herein. In some examples, aspects of the operations of 2115 may be performed by a multiplexing component as described with reference to FIGS. 11 through 14. In some cases, the indication from the UE indicates one or more of a payload size, a length, a resource element location, or any combinations thereof, of the multiplexed data. In some cases, the indication from the UE is transmitted in a subsequent uplink communication to the first TRP that is transmitted after the first uplink communication.

At 2120, the first TRP may determine, based on an indication provided by the UE, that the first uplink communication includes multiplexed data from a second uplink communication associated with the second TRP. The operations of 2120 may be performed according to the methods described herein. In some examples, aspects of the operations of 2120 may be performed by a multiplexing component as described with reference to FIGS. 11 through 14.

At 2125, the first TRP may provide the multiplexed data to the second TRP. The operations of 2125 may be performed according to the methods described herein. In some examples, aspects of the operations of 2125 may be performed by a TRP coordination manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that a combined transmission power for concurrent transmissions of a first communication to a first transmission-reception-point (TRP) and a second communication to a second TRP exceeds a power threshold of the UE;
    determining whether to reduce a transmission power of one or more of the first communication or the second communication, or to drop one of the first communication or the second communication, comprising:
        identifying a first traffic priority of the first communication and a second traffic priority of the second communication;
        determining a first power reduction factor for the first communication based at least in part on the first traffic priority and a second power reduction factor for the second communication based at least in part on the second traffic priority;
        applying the first power reduction factor to a first initial transmission power of the first communication to obtain a first adjusted transmission power and the second power reduction factor to a second initial transmission power of the second communication to obtain a second adjusted transmission power; and
    transmitting one or more of the first communication or the second communication based at least in part on the determining.

2. The method of claim 1, wherein the first traffic priority and the second traffic priority are identified based at least in part on one or more of a control resource set (CORESET) identification associated with the first communication and the second communication, a radio resource control (RRC) configuration, a type of data to be transmitted in the first communication and the second communication, or any combinations thereof.

3. The method of claim 1, wherein the determining further comprises:
    determining to reduce the transmission power of one or more of the first communication or the second communication when a difference between the first adjusted transmission power and the second adjusted transmission power is less than or equal to a power difference threshold; and
    determining to drop one of the first communication or the second communication when the difference between the first adjusted transmission power and the second adjusted transmission power exceeds the power difference threshold.

4. The method of claim 1, wherein the determining comprises determining to drop the first communication, and wherein the method further comprises:
    multiplexing at least a portion of information to be transmitted in the first communication into the second communication.

5. The method of claim 4, wherein the first communication has a lower traffic priority than the second communication and the portion of information to be transmitted in the first communication comprises control information associated with the first communication, and
    wherein the first communication is an enhanced mobile broadband (eMBB) communication and the second communication is an ultra-reliable low latency communication (URLLC), and wherein a URLLC codebook accommodates transmission of eMBB control information with a URLLC communication.

6. The method of claim 4, wherein the multiplexing comprises:
    rate-matching first uplink control information of the first communication around second uplink control information of the second communication, and rate-matching uplink data of the second communication around the first uplink control information and the second uplink control information.

7. The method of claim 4, wherein the multiplexing comprises:
    puncturing a portion of the second communication with first uplink control information of the first communication.

8. The method of claim 4, wherein the multiplexing further comprises:
    transmitting an indication to the second TRP that indicates that the portion of information to be transmitted in the first communication is multiplexed into the second communication, and wherein the indication further indicates rate-matching or puncturing of the second communication.

9. The method of claim 8, wherein:
    the indication to the second TRP indicates one or more of a payload size, a length, a resource element location, or any combinations thereof, of the portion of information to be transmitted in the first communication is multiplexed into the second communication, and
    the indication to the second TRP is transmitted in a subsequent uplink communication with the second TRP that is transmitted after the second communication in a medium access control (MAC) control element (MAC-CE) or in an uplink control information transmission to the second TRP.

10. An apparatus for wireless communication at a user equipment (UE), comprising:
    a processor,
    memory in electronic communication with the processor; and
    instructions stored in the memory and executable by the processor to cause the apparatus to:
        identify that a combined transmission power for concurrent transmissions of a first communication to a first transmission-reception-point (TRP) and a second communication to a second TRP exceeds a power threshold of the UE;
determine whether to reduce a transmission power of one or more of the first communication or the second communication, or to drop one of the first communication or the second communication, comprising:
identify a first traffic priority of the first communication and a second traffic priority of the second communication;
determine a first power reduction factor for the first communication based at least in part on the first traffic priority and a second power reduction factor for the second communication based at least in part on the second traffic priority;
apply the first power reduction factor to a first initial transmission power of the first communication to obtain a first adjusted transmission power and the second power reduction factor to a second initial transmission power of the second communication to obtain a second adjusted transmission power; and
transmit one or more of the first communication or the second communication based at least in part on the determining.

11. The apparatus of claim 10, wherein the instructions are further executable by the processor to cause the apparatus to:
determine to reduce the transmission power of one or more of the first communication or the second communication when a difference between the first adjusted transmission power and the second adjusted transmission power is less than or equal to a power difference threshold; and
determine to drop one of the first communication or the second communication when the difference between the first adjusted transmission power and the second adjusted transmission power exceeds the power difference threshold.

12. The apparatus of claim 10, wherein the instructions are further executable by the processor to cause the apparatus to:
determine to drop the first communication, and wherein the method further comprises; and
multiplex at least a portion of information to be transmitted in the first communication into the second communication.

13. The apparatus of claim 12, wherein the first communication has a lower traffic priority than the second communication, and wherein the portion of information to be transmitted in the first communication comprises control information associated with the first communication.

14. The apparatus of claim 12, wherein the instructions are further executable by the processor to cause the apparatus to:
rate-match first uplink control information of the first communication around second uplink control information of the second communication, and rate-matching uplink data of the second communication around the first uplink control information and the second uplink control information, or
puncture a portion of the second communication with first uplink control information of the first communication.

* * * * *